(12) United States Patent
Kaminushi

(10) Patent No.: US 10,218,650 B2
(45) Date of Patent: Feb. 26, 2019

(54) INFORMATION PROCESSING SYSTEM

(71) Applicant: Kyohsuke Kaminushi, Kanagawa (JP)

(72) Inventor: Kyohsuke Kaminushi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 86 days.

(21) Appl. No.: 15/122,690

(22) PCT Filed: Mar. 30, 2015

(86) PCT No.: PCT/JP2015/060682
§ 371 (c)(1),
(2) Date: Aug. 31, 2016

(87) PCT Pub. No.: WO2015/152418
PCT Pub. Date: Oct. 8, 2015

(65) Prior Publication Data
US 2017/0126593 A1  May 4, 2017

(30) Foreign Application Priority Data

Apr. 1, 2014 (JP) .................................. 2014-075114
Mar. 24, 2015 (JP) .................................. 2015-061024

(51) Int. Cl.
*G06F 15/173* (2006.01)
*H04L 12/58* (2006.01)
(Continued)

(52) U.S. Cl.
CPC .......... *H04L 51/04* (2013.01); *G06F 13/4286* (2013.01); *G06F 21/6218* (2013.01);
(Continued)

(58) Field of Classification Search
CPC ........... H04B 7/15542; H04N 7/17318; H04N 21/26216; H04N 21/4586; H04N 21/4627; G06F 21/6218
See application file for complete search history.

(56) References Cited

U.S. PATENT DOCUMENTS 7,673,001 B1  3/2010  Battle et al.
7,693,951 B2  4/2010  Gusler et al.
(Continued)

FOREIGN PATENT DOCUMENTS

JP  H11-077501  3/1999
JP  2007-274483  10/2007
(Continued)

OTHER PUBLICATIONS

Australian Examination report No. 3 for 2015242797 dated Oct. 19, 2017.
(Continued)

*Primary Examiner* — Kyung H Shin
(74) *Attorney, Agent, or Firm* — IPUSA, PLLC

(57) ABSTRACT

An information processing system includes information terminals; an information processing apparatus; and an information storage apparatus connected to a network different from a network to which the information processing apparatus is connected. Further, the information processing apparatus includes a receiving unit receiving information from one of the information terminals, and a transmission unit transmitting the information to other information terminals and the information storage apparatus. Each of the information terminals includes a transmission unit transmitting the information to the information processing apparatus, and a receiving unit receiving information from the information processing apparatus. The information storage apparatus includes a storage unit storing the information from the information processing apparatus.

11 Claims, 25 Drawing Sheets

(51) Int. Cl.
| | |
|---|---|
| *H04N 7/173* | (2011.01) |
| *G06F 21/62* | (2013.01) |
| *H04B 7/155* | (2006.01) |
| *G06Q 10/10* | (2012.01) |
| *G06F 13/42* | (2006.01) |
| *H04L 29/08* | (2006.01) |

(52) U.S. Cl.
CPC ........... *G06Q 10/10* (2013.01); *G06Q 10/107* (2013.01); *H04B 7/15542* (2013.01); *H04L 67/10* (2013.01); *H04N 7/17318* (2013.01)

(56) References Cited

U.S. PATENT DOCUMENTS

| | | | |
|---|---|---|---|
| 2004/0073677 A1 | 4/2004 | Honma et al. | |
| 2004/0078446 A1 | 4/2004 | Daniell et al. | |
| 2004/0268151 A1* | 12/2004 | Matsuda | G06F 21/6218 726/11 |
| 2009/0094253 A1* | 4/2009 | Hanai | H04N 7/17318 |
| 2009/0216836 A1 | 8/2009 | Haynes et al. | |
| 2010/0077029 A1 | 3/2010 | Shook et al. | |
| 2011/0231499 A1 | 9/2011 | Stovicek et al. | |
| 2011/0238761 A1 | 9/2011 | Mizokami | |
| 2012/0084665 A1 | 4/2012 | Bookstaff | |
| 2012/0149339 A1 | 6/2012 | Mulampaka et al. | |
| 2013/0018963 A1 | 1/2013 | Brauff et al. | |
| 2013/0070780 A1* | 3/2013 | Hozumi | H04B 7/15542 370/437 |
| 2014/0280774 A1 | 9/2014 | Kaminushi | |

FOREIGN PATENT DOCUMENTS

| | | |
|---|---|---|
| JP | 2007-287159 | 11/2007 |
| JP | 2010-128888 | 6/2010 |
| JP | 2011-209926 | 10/2011 |
| WO | 2013/010177 | 1/2013 |

OTHER PUBLICATIONS

Canadian Office Action for 2941864 dated Jun. 20, 2017.
Extended European Search Report dated Jan. 4, 2017.
International Search Report dated Jun. 23, 2015 in PCT/JP2015/060682 filed on Mar. 30, 2015.
Russian Office Action for 2016138154 dated Jan. 10, 2018.

* cited by examiner

FIG.9

[{"id":"file_storage_a", "address": "192.168.0.2","file_storage_id": "file_storage_a_id", "activate":"http://192.168.0.2/activate/user1/abcdefghijklmnopqrstuvwxyz", "userid":"User A", "password": "01234567"}]

| GROUP NAME | USERS |
|---|---|
| GROUP 1 | User A, User B |
| GROUP 2 | User A, User C |
| GROUP 3 | User A, User B, User C |
| ⋮ | ⋮ |

FIG.22

| GROUP NAME | USERS | LOG STORAGE DESTINATION |
|---|---|---|
| GROUP 1 | User A, User B | FILE SERVER A |
| GROUP 2 | User A, User C | – |
| GROUP 3 | User A, User B, User C | FILE SERVER A |
| ⋮ | ⋮ | ⋮ |

| GROUP NAME | REQUEST RECEPTION USERS |
|---|---|
| GROUP 1 | User A, FILE SERVER A, FILE SERVER B |
| GROUP 2 | User A, User B, FILE SERVER A, FILE SERVER B |
| ⋮ | ⋮ |

FILE SERVER A

| GROUP NAME | USERS |
|---|---|
| GROUP 1 | User A, User D |

FILE SERVER B

| GROUP NAME | USERS |
|---|---|
| GROUP 2 | User A, User B |
| GROUP 3 | User A, User B, User C |

FIG.32

| USER NAME | TERMINAL ID |
|---|---|
| User A | 00001 |
| User B | 00002 |
| User C | 00003 |

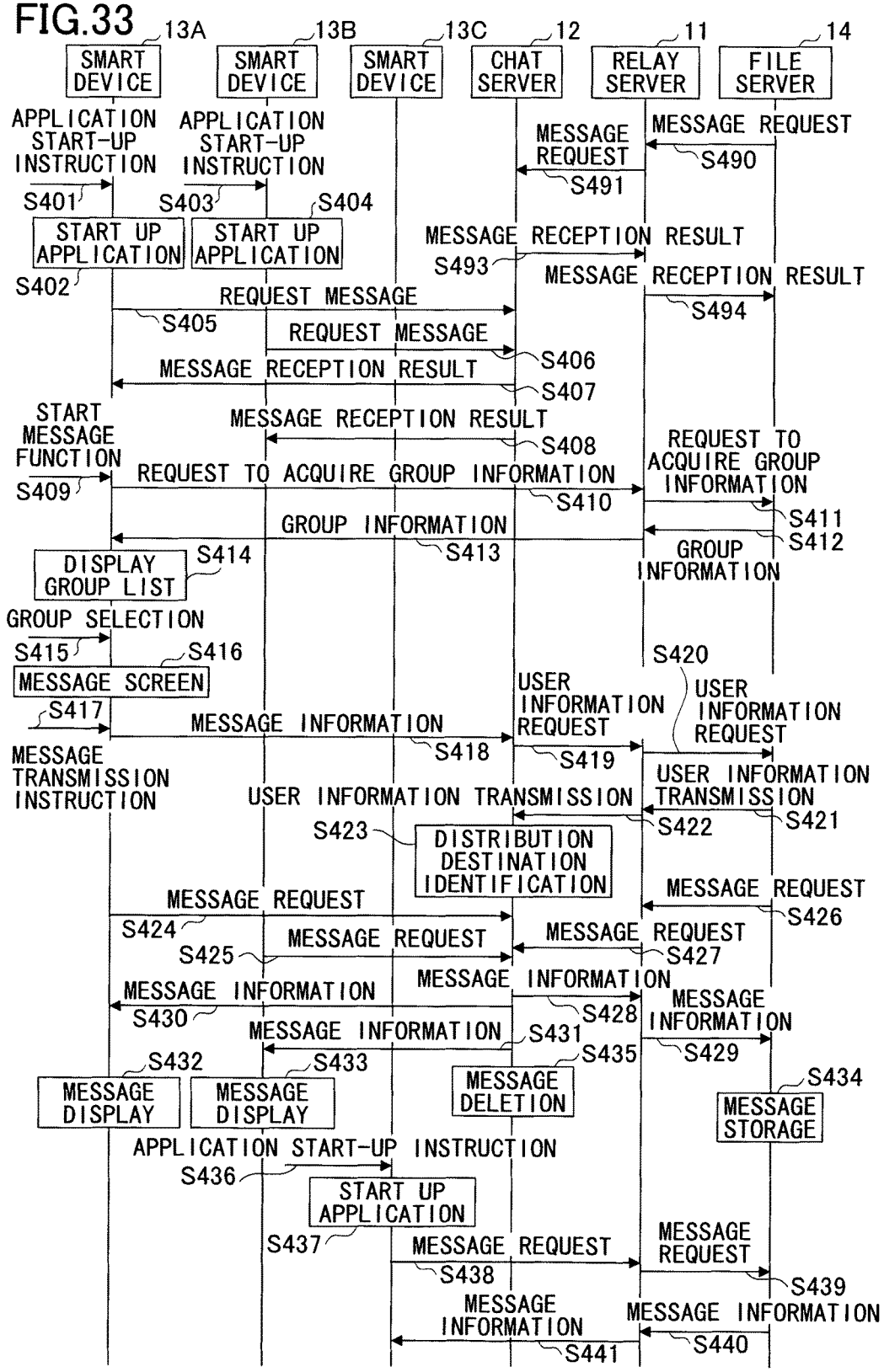

INFORMATION PROCESSING SYSTEM

TECHNICAL FIELD

The present invention relates to an information processing system.

BACKGROUND ART

In order to transmit and receive a message and a file in real time and safely, there is a known method in which a chat message of text data transmitted from a chat server is converted into a chat message image of image data, and the chat message image is transmitted to a chat terminal device.

In a conventional chat system, in order to reduce a risk of correcting or altering the content of a chat message and leaking of information by text data extraction, a chat message is displayed based on image data (see, for example, Patent Document 1).

SUMMARY OF THE INVENTION

Problems to be Solved by the Invention

In an information processing system such as a chat system, there may be a case where the information such as chat logs which are exchanged between information terminals such as smart devices via the Internet or a global network is stored in an information processing apparatus such as a chat server.

However, the information stored in the information processing apparatus such as the chat server on a global network is not secure.

An embodiment of the present invention is made in light of the above problem, and may provide an information processing system and an information processing method capable of ensuring the security of the stored information.

Means for Solving the Problems

According to an aspect of the present invention, an information processing system includes a plurality of information terminals; an information processing apparatus; and an information storage apparatus. Further, a network to which the information processing apparatus is connected differs from a network to which the information storage apparatus is connected in the information processing system. Further, the information processing apparatus includes a receiving unit receiving information that is transmitted from one of the plurality of information terminals, and a transmission unit transmitting the information, which is received by the receiving unit, to one or more other information terminals and the information storage apparatus. Further, each of the plurality of information terminals includes a transmission unit transmitting the information to the information processing apparatus, and a receiving unit receiving information which is transmitted from the information processing apparatus. Further, the information storage apparatus includes a storage unit storing the information which is transmitted from the information processing apparatus.

Effects of the Present Invention

According to an aspect of the present invention, it becomes possible to ensure the security of stored information.

BRIEF DESCRIPTION OF THE DRAWINGS

FIG. 9 illustrates an example configuration of the information acquired from such a two-dimensional code;

FIG. 22 is a drawing illustrating another example configuration of the user group information;

FIG. 32 is a drawing illustrating an example configuration of user/terminal information; and FIG. 33 is a sequence diagram of another example of the message transmission process.

BEST MODE FOR CARRYING OUT THE INVENTION

In the following, details of preferred embodiments of the present invention are described.

First Embodiment

System Configuration

Figure 1:
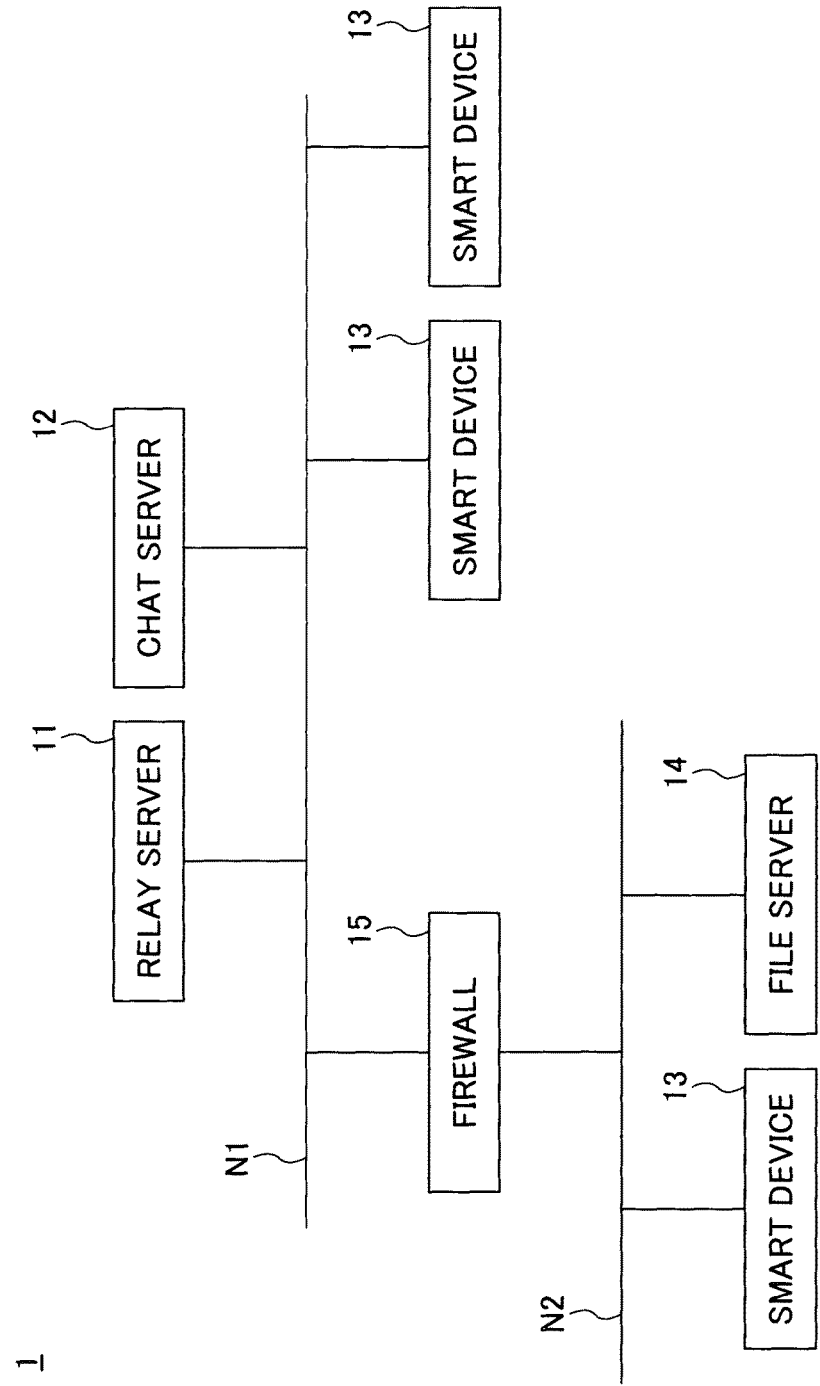
FIG. 1 is a drawing illustrating an example configuration of an information processing system according to an embodiment.

FIG. 1 illustrates an example configuration of an information processing system according to an embodiment. An information processing system 1 of FIG. 1 includes a relay server 11, a chat server 12, smart devices 13, a file server 14, and a firewall (FW) 15.

The relay server 11, the chat server 12, and at least some of the smart devices 13 are connected to a network N1 which is a global network such as the Internet. Further, at least some of the smart devices 13 and the file server 14 are connected to a network N2 which is a local network such as a Local Area Network (LAN). The network N1 and the network N2 are connected to each other via the FW 15.

The relay server 11 first receives a request from the chat server 12 and the smart devices 13 connected to the network N1 to be transmitted to the file server 14 connected to the network N2, and then transmits the received request to the file server 14 in accordance with a request from the file server 14.

The chat server 12 receives conversation content, etc. from the smart device 13 for chatting among conversation content, etc., so as to distribute the conversation content, etc. The smart device 13 refers to a terminal device used by a user.

The file server 14 stores the files shared among users, the logs of the conversation content input by the users via the chat server 12, etc. The file server 14 is connected to the network N2. Therefore it is not possible for the relay server 11, the chat server 12, and the smart devices 13 connected to the network N1 to directly access the file server 14. It is possible for the file server 14 to access the relay server 11, the chat server 12, and the smart devices 13 connected to the network N1.

The file server 14 repeatedly sends an inquiry to the relay server 11 about whether the relay server 11 receives a request. When the relay server 11 receives a request, the file server 14 receives the request from the relay server 11, and performs processing on the request. Further, the file server 14 transmits the processing result of the request to the relay server 11, so that the smart device 13 having sent the request can receive the processing result of the request. By doing this, a request, which is sent from the smart device 13 connected to the network N1 to the file server 14 connected to the network N2, can be transmitted indirectly to the file server 14 via the relay server 11.

It is possible for the relay server 11, the chat server 12, and the smart devices 13 connected to the network N1 to communicate with each other. Similarly, it is possible for the smart devices 13 and the file server 14 connected to a network N2 to communicate with each other. In FIG. 1, the smart device 13 is an example of the terminal device which is operated by a user. The smart device 13 refers to a device that can be operated by a user such as a smartphone, a tablet terminal, a cellular phone, a laptop personal computer (PC), etc.

Note that the configuration of the information processing system 1 of FIG. 1 is an example only. Needless to say is that the information processing system 1 may have various system configurations based on the application and the object thereof. For example, the relay server 11, the chat server 12, and the file server 14 of FIG. 1 may be dispersed into respective plural computers. Further, for example, the relay server 11 and the chat server 12 may be integrated into a single computer.

Hardware Configuration

Figure 2:
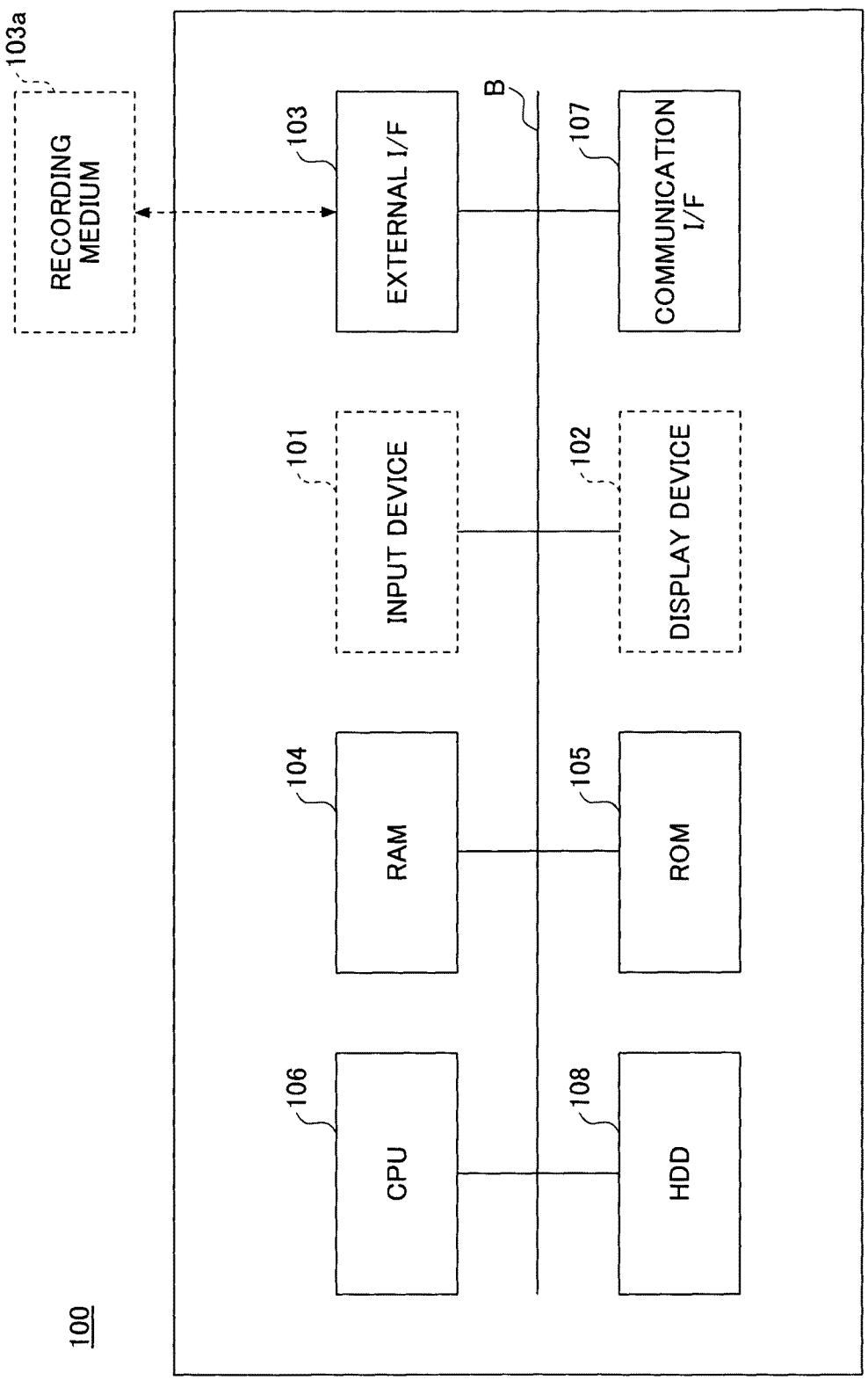
FIG. 2 is a drawing illustrating an example hardware configuration of a computer according to an embodiment of the present invention.

The relay server 11, the chat server 12, the smart devices 13, and the file server 14 can be realized by computers having, for example, a hardware configuration as illustrated in FIG. 2. FIG. 2 illustrates an example hardware configuration of a computer according to an embodiment.

A computer 100 of FIG. 2 includes an input device 101, a display device 102, an external interface (I/F) 103, a Random Access Memory (RAM) 104, a Read-Only Memory (ROM) 105, a Central Processing Unit (CPU) 106, a communication I/F 107, a Hard Disk Drive (HDD) 108, etc., which are connected to each other via a bus B. Here, the input device 101 and the display device 102 may be provided on an as-needed basis.

The input device 101 includes a keyboard, a touch panel, etc., and is used to input various operational signals. The display device 102 includes a display, etc., and displays a processing result by the computer 100. The input device 101 and the display device 102 may be provided on an as-needed basis.

The communication I/F 107 is an interface to connect the computer 100 to the network N1 or N2, so that the computer 100 can perform data communication via the communication I/F 107.

The HDD 108 is an example of a non-volatile storage device storing programs and data. The programs and data stored in the HDD 108 include an Operating System (OS) which is basic software, application software (hereinafter simplified as "application") which runs on the OS and provides various functions, etc. The computer 100 may alternatively use a drive device (e.g., Solid State Drive (SSD)), which uses a flash memory as a recording medium, in place of the HDD 108.

The HDD 108 manages the programs and data stored therein by using a predetermined file system and/or a database (DB). The external I/F 103 is an interface with an external device. The external device includes, for example, a recording medium 103a.

The computer 100 can read and write programs and data with the recording medium 103a via the external I/F 103. The recording medium 103a includes, for example, a flexible disk, a Compact Disk (CD), a Digital Versatile Disk (DVD), an SD memory card, a Universal Serial Bus (USB) memory, etc.

The ROM 105 is an example of a non-volatile semiconductor memory (storage device) that can hold programs and data even when the power thereto is cut off. The ROM 105 stores programs and data such as Basic Input Output System (BIOS), which is executed when the computer 100 is started up, OS settings, network settings, etc. The RAM 104 is an example of a volatile semiconductor memory (storage device) which temporarily stores programs and data.

The CPU 106 is an arithmetic device (operational equipment) to control the entire computer 100 and realize functions by loading programs and data from the storage device such as the ROM 105, the HDD 108, etc., into the RAM 104, and executing processes.

By having such a hardware configuration of the computer 100 as illustrated in FIG. 2, it becomes possible for the relay server 11, the chat server 12, the smart device 13, and the file server 14 to realize various processes described below.

Software Configuration

Smart Device 13

Figure 3:
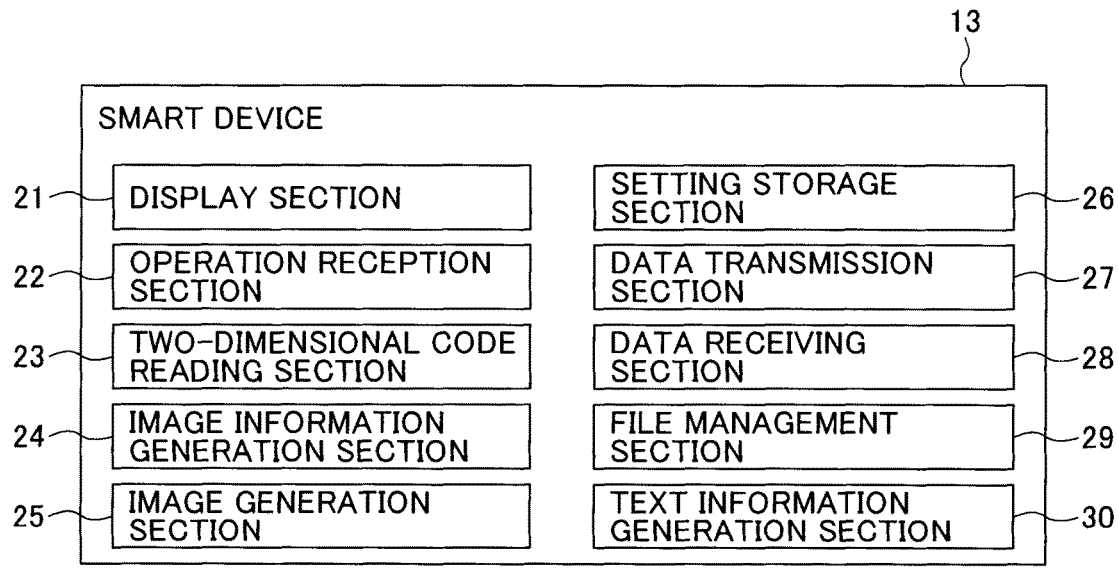
FIG. 3 is a block diagram of example functions of a smart device according to an embodiment.

The smart device 13 according to an embodiment has, for example, processing blocks as exemplarily illustrated in FIG. 3. FIG. 3 is a block diagram of an example of the processes (functions) of the smart device 13 according to an embodiment. By executing an application, the smart device 13 realizes a display section 21, an operation reception section 22, a two-dimensional code reading section 23, an image information generation section 24, an image generation section 25, a setting storage section 26, a data transmission section 27, a data receiving section 28, a file management section 29, and a text information generation section 30.

The display section 21 displays a file content, a chat conversation content, a file selection screen, etc. to a user. The operation reception section 22 receives user's operations. The two-dimensional code reading section 23 reads a two-dimensional code.

The image information generation section 24 generates image information indicating the position of a partial image, which is selected by a user from among file images displayed on the display section 21, the file name, etc. The image generation section 25 generates an image based on the image information. The setting storage section 26 stores a user name, a password, a group, etc.

The data transmission section 27 transmits the chat conversation content, the image information, etc. The data receiving section 28 receives the chat conversation content, the image information, the file, etc. The file management section 29 stores and discards the cache of the received file. The text information generation section 30 generates character string information such as the position of the character string and the file name, which are selected by a user from among the files displayed on the display section 21.

Chat Server 12

Figure 4:
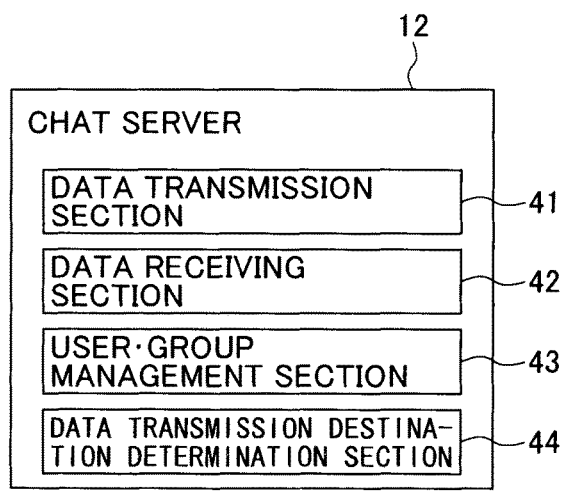
FIG. 4 is a block diagram of example functions of a chat server according to an embodiment.

The chat server 12 according to an embodiment has processing blocks as exemplarily illustrated in FIG. 4. FIG. 4 is a block diagram of an example of the processes (functions) of the chat server 12 according to an embodiment. By executing a program, the chat server 12 realizes a data transmission section 41, a data receiving section 42, a user group management section 43, and a data transmission destination determination section 44.

The data transmission section 41 transmits data such as the chat conversation content, etc. The data receiving section 42 receives the data such as the chat conversation content, etc. The user group management section 43 manages the users who are participating in chat and groups to which the chat conversation content is transmitted. The data transmission destination determination section 44 determines the group to which the chat conversation content is to be transmitted. The chat server 12 provides a chat function.

Relay Server 11

Figure 5:
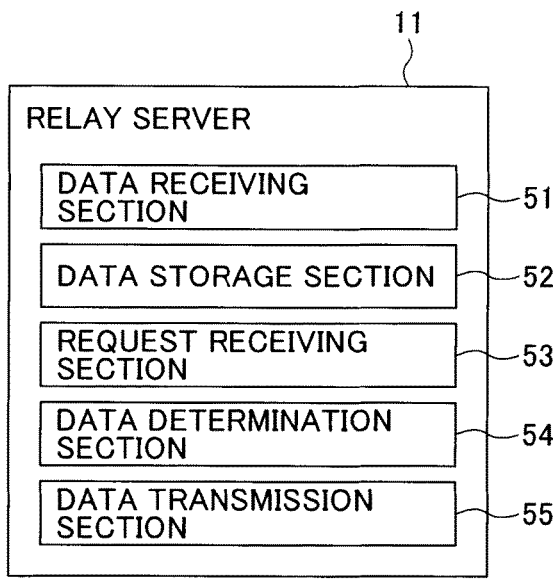
FIG. 5 is a block diagram of example functions of a relay server according to an embodiment.

The relay server 11 according to an embodiment has, for example, processing blocks as exemplarily illustrated in FIG. 5. FIG. 5 is a block diagram of an example of the processes (functions) of the relay server 11 according to an embodiment. For example, by executing a program, the relay server 11 realizes a data receiving section 51, a data storage section 52, a request receiving section 53, a data determination section 54, and a data transmission section 55.

The data receiving section 51 receives data from the smart device 13 which is connected, for example, to the network N1, the smart device ID of the transmission source of the data, and the file server ID of the transmission destination of the data. The data storage section 52 stores the received various data in association with each other. The request receiving section 53 receives an inquiry about whether there exists a request from the file server 14.

The data determination section 54 determines whether the data are stored therein which are in association with the file server ID of the file server 14 from which the request receiving section 53 receives the inquiry. The data transmission section 55 transmits the data to the file server 11 from which the inquiry is received when it is determined that the data are stored in the data determination section 54.

File Server 14

Figure 6:
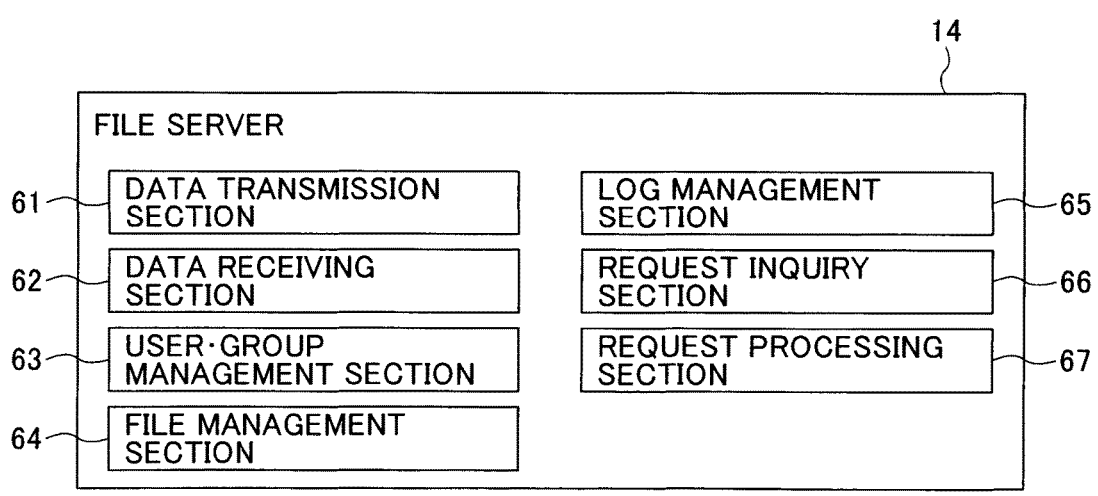
FIG. 6 is a block diagram of example functions of a file server according to an embodiment.

The file server 14 according to an embodiment has, for example, processing blocks as exemplarily illustrated in FIG. 6. FIG. 6 is a block diagram of an example of the processes (functions) of the file server 14 according to an embodiment. For example, by executing an program, the file server 14 realizes a data transmission section 61, a data receiving section 62, a user group management section 63, a file management section 64, a log management section 65, a request inquiry section 66, and a request processing section 67.

The data transmission section 61 transmits data such as a file, a processing result of a request, etc. The data receiving section 62 receives data such as a file, logs of chat conversation content, a request from another smart device 13, etc. The user group management section 63 manages users who are participating in chat and a group in which the chat conversation content is transmitted.

The file management section 64 stores a received file and reads a stored file. The log management section 65 stores the logs of the chat conversation content. The request inquiry section 66 sends an inquiry to the relay server 11 about whether there exists a request. The request processing section 67 performs processing on a request based on the request content.

Details of Processes

In the following, details of the processes of the information processing system 1 according to an embodiment are described.

Device Registration

In the information processing system 1 according to an embodiment, first, it is necessary to register the smart devices 13 that can access the file server 14. To that end, for example, in the information processing system 1, the registration (pairing) of the smart device 13 that can access the file server 14 is made by using a two-dimensional code as described below.

Figure 7:
FIG. 7 is a schematic view of an example Web User Interface (UI) using a two-dimensional code.

FIG. 7 is a schematic view of an example Web User Interface (UI) using a two-dimensional code. As a WebUI of FIG. 7, a two-dimensional code such as QR code (registered trademark) is displayed. A user places a smart device 13, which is to be registered as a smart device 13 that can access the file server 14, so that the smart device 13 can read the two-dimensional code displayed in the WebUI.

Figure 8:
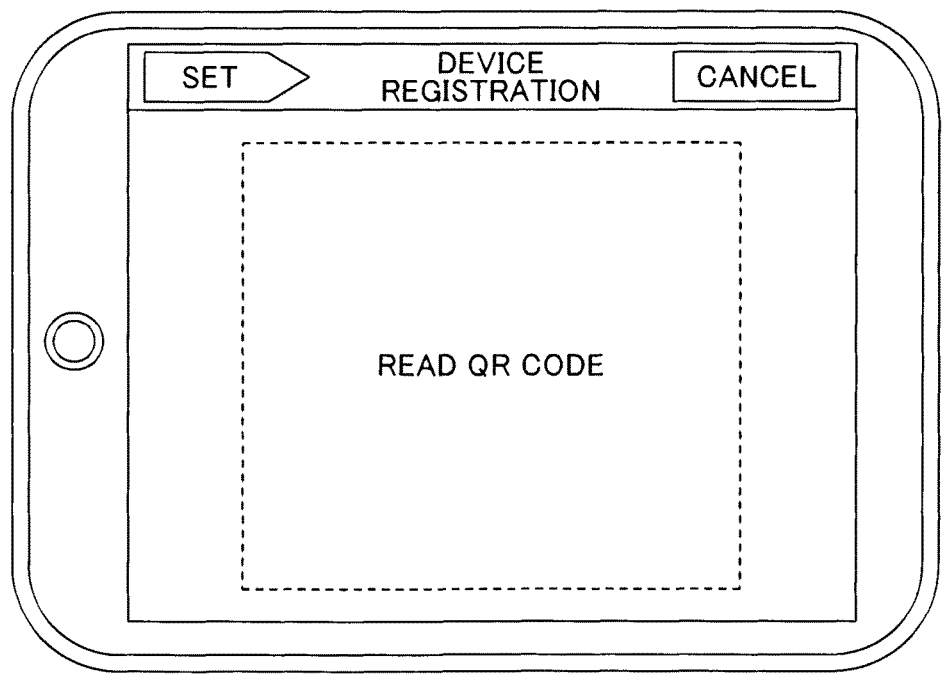
FIG. 8 is a schematic view of an example screen to read such a two-dimensional code.

FIG. 8 is a schematic view of an example screen to read such a two-dimensional code. By adjusting the position of the smart device 13 so that the imaged (captured) two-dimensional code is displayed within the dotted lines (square) of the screen in FIG. 8, the smart device 13 can read the two-dimensional code by the user. Here, it is assumed that the registration of the smart device 13 is performed regardless of whether the smart device 13 accesses the file server 14 via the relay server 11. By reading the two-dimensional code, it become possible for the smart device 13 to acquire information as illustrated in FIG. 9, which is necessary to access the file server 14.

Here, the WebUI of FIG. 7 may be displayed by accessing an information processing apparatus such as the file server 14, etc., by using a terminal device used by a user. Further, a printed two-dimensional code may alternatively be used.

FIG. 9 illustrates an example configuration of the information acquired from such a two-dimensional code. The information of FIG. 9 includes the unique ID and the IP address of the file server 14, an ID to be used when the relay server 11 is used, and a link to be used for activation.

Figure 10:
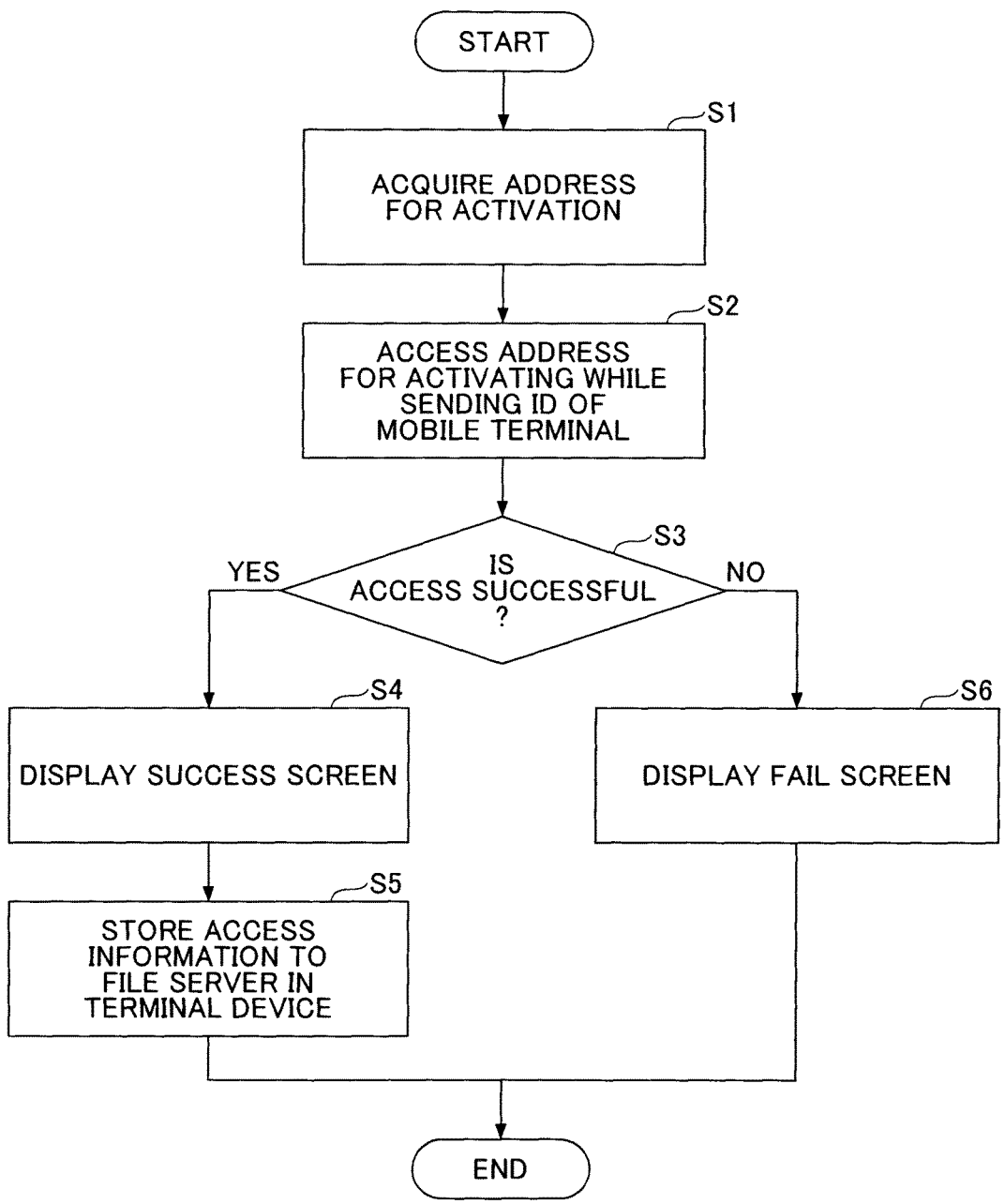
FIG. 10 is a flowchart of a registration process of the smart device.

FIG. 10 is a flowchart of a registration process of the smart device 13. In step S1, the smart device 13 acquires the link, which is used for activation, as illustrated in FIG. 9, based on, for example, the two-dimensional code of FIG. 7.

In step S2, while transmitting the smart device ID of the smart device 13, the smart device 13 accesses the link which is used for activation (i.e., the address for activation).

In step S3, the smart device 13 further accesses the link to be used for activation and determines whether the smart device 13 is registered in the file server 14. When accessing the link to be used for activation and determining that the smart device 13 is registered in the file server 14 in step S3, the process goes to step S4, where the smart device 13 displays a success screen as illustrated in FIG. 11.

Figure 11:
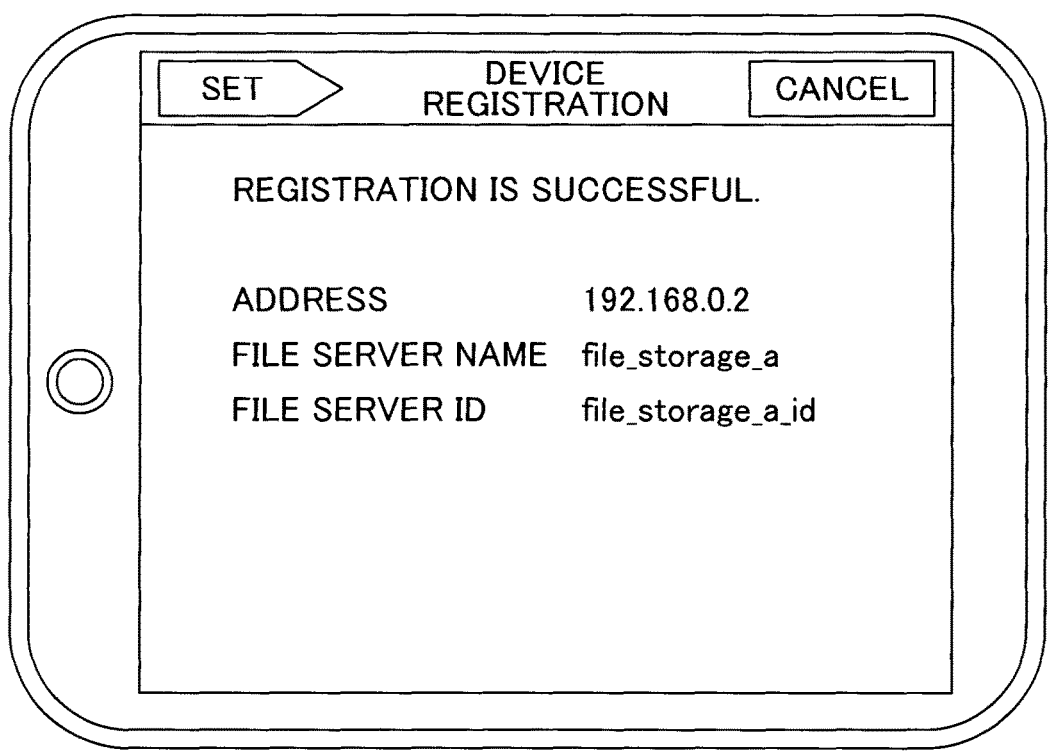
FIG. 11 is a schematic view of an example success screen.

FIG. 11 is a schematic view of an example of a success screen. The success screen of FIG. 11 displays a message indicating that the registration of the smart device 13 is successful, the IP address of the file server 14 that registers the smart device 13, the file server name, and the file server ID. After step S4, the process goes to step S5, where the smart device 13 stores the information which is necessary to access the file server 14 (i.e., access information to the file server 14). When the registration in the file server 14 has failed in step S3, the smart device 13 displays a fail screen in step S6.

The flowchart of FIG. 10 illustrates a procedure in which activation is performed based on the address for activation acquired based on the two-dimensional code, the information of the smart device 13 is registered in the file server 14, and the information of the file server 14 is registered in the smart device 13.

The file server 14 does not permit any access from a smart device 13 which has not registered. In order for the smart device 13 to use the file server 14, it is necessary for the smart device 13 to perform the smart device registration process of FIG. 10. The smart device 13 which has performed the smart device registration process can fetch the information and the file stored in the file server 14. As a result of the smart device registration process of FIG. 10, the smart device ID which is unique to the smart device 13 is registered, so that it becomes possible for the file server 14 to prevent "identity theft (spoofing)" from any other smart devices 13.

Specifically, the user group management section 63 of the file server 14 stores the user name which is already registered (identification information to identify the user) and a terminal ID (identification information to identify the terminal) in a manner as illustrated in FIG. 32. Further, folders (user folders) that can be accessed by only a user may be generated for each of the registered users.

Group Generation

In the information processing system 1 according to an embodiment, it is necessary to generate a group in which the chat conversation content can be transmitted. For example, in the information processing system 1, a group is generated where the chat conversation content can be transmitted as described below. In the following, the smart devices used by Users A and B are called a "smart device 13A" and a "smart device 13B", respectively.

Figure 12:
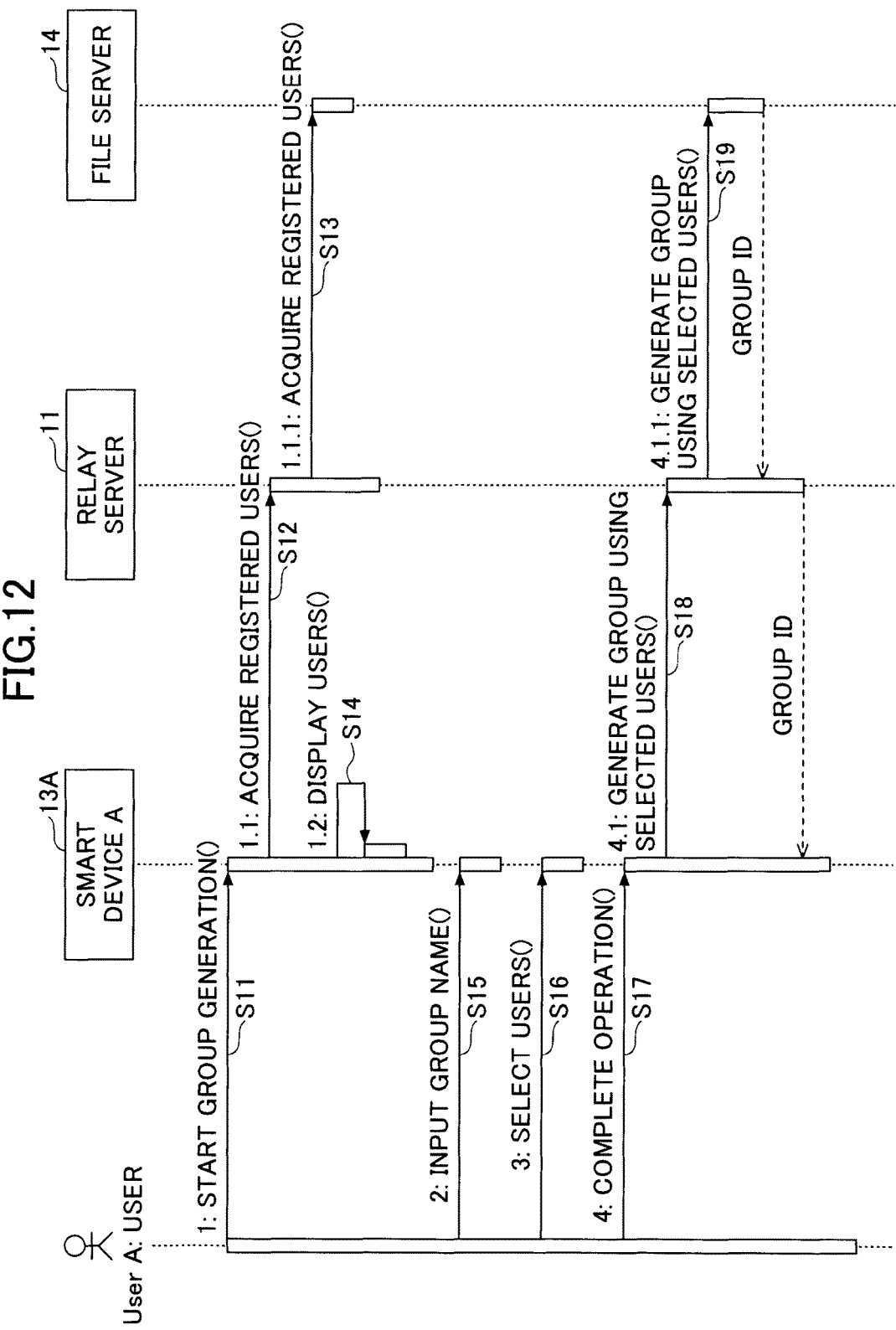
FIG. 12 is a sequence diagram of an example of a group generation process.

FIG. 12 is a sequence diagram of an example of a group generation process. In step S11, the User A operating the smart device 13A sends an instruction to start group generation to the smart device 13A. In steps S12 and S13, the smart device 13A sends a request to acquire the information of the registered users who can participate in chat to the file server 14 via the relay server 11. The file server 14 transmits the information of the registered users to the smart device 13A via the relay server 11.

Namely, in step S12 and S13, the file server 14 transmits the user names, which are registered in the file server 14 stored in the manner as illustrated in FIG. 32, to the smart device 13A.

Figure 13:
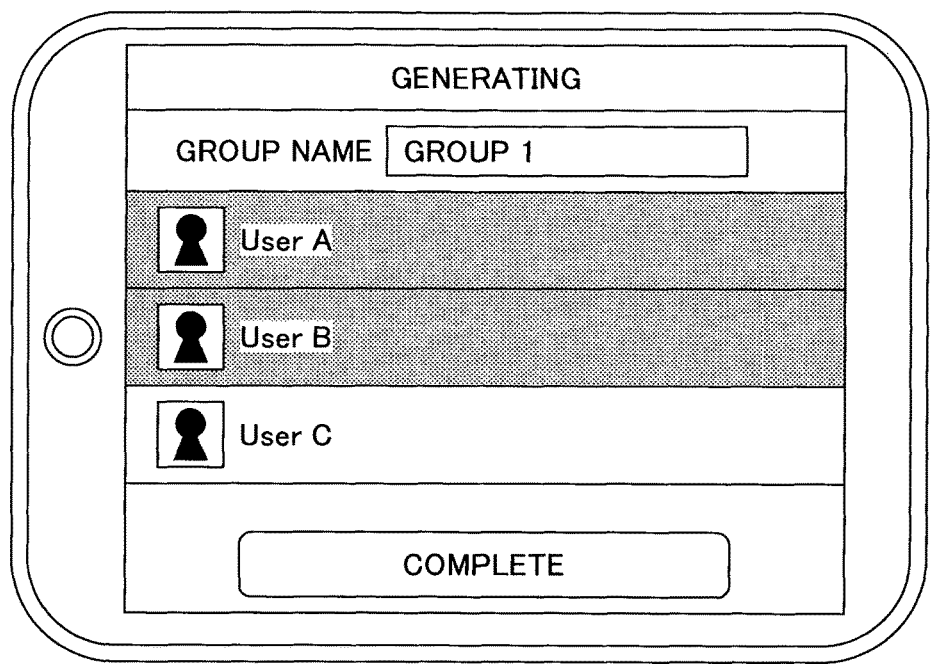
FIG. 13 is a schematic view of an example of a group generation screen.

In step S14, by using the received information of the registered users, the smart device 13A displays a group generation screen as illustrated in FIG. 13. FIG. 13 is a schematic view of an example of the group generation screen. The group generation screen is an example of a screen displayed on the smart device 13A to generate a group. The group generation screen of FIG. 13 includes a row to input a group name and rows to select the users.

In step S15, the User A operates the smart device 13A to input a group name in the group generation screen. Further, in step S16, the User A operates the smart device 13A to select users who participate in the group in the group generation screen. In step S17, the User A operates the smart device 13A to perform a complete operation by pressing a "complete" button in the group generation screen.

When the complete operation is performed by the User A, the process goes to step S18. In step S18, the smart device 13A sends a request to the file server 14 to generate a group by using the group name, which is input in step S15, and the users who are selected in step S16. In step S19, the request to generate the group from the smart device 13A is transmitted from the relay server 11 to the file server 14. The file server 14 having received the request to generate the group generates the group by using the group name, which is input in step S15, and the users who are selected in step S16, and manages the group in association with the users as illustrated in FIG. 18.

Chat Process

Figure 14:
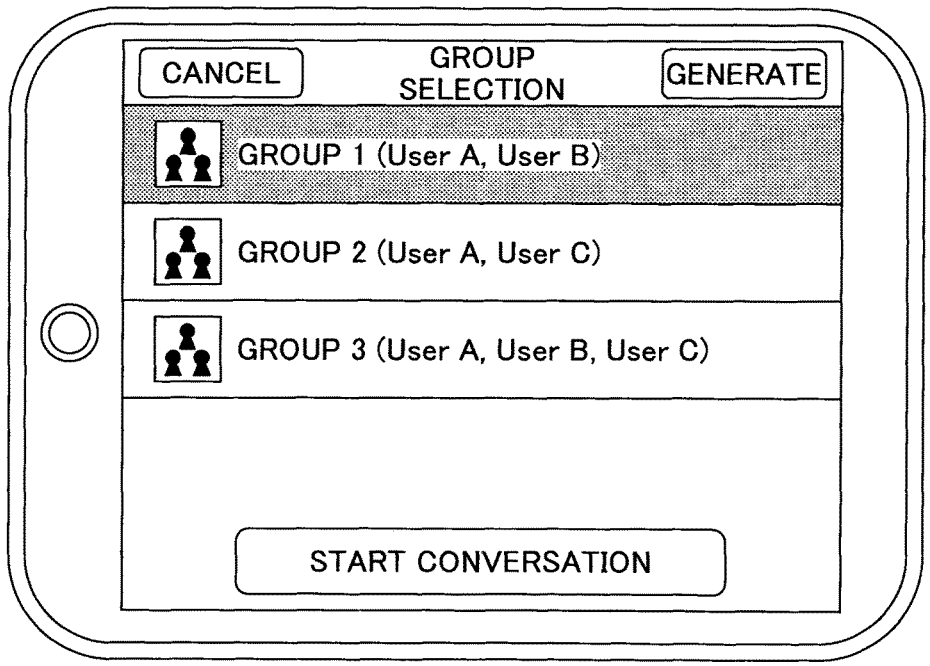
FIG. 14 is a schematic view of an example of a group selection screen for chatting.

In the information processing system 1 according to an embodiment, as described below, chat is performed among the smart devices 13 which participate in the group. FIG. 14 is a schematic view of an example of a group selection screen for chatting. A user selects a group to chat in such a group selection screen as illustrated in FIG. 14, and presses a "start conversation" button. Here, the group information displayed in the group selection screen can be acquired from the file server 14. When the "start conversation" button is pressed, the smart device 13 transmits the group to chat, which is selected in the group selection screen, to the chat server 12.

Figures 18, 19:
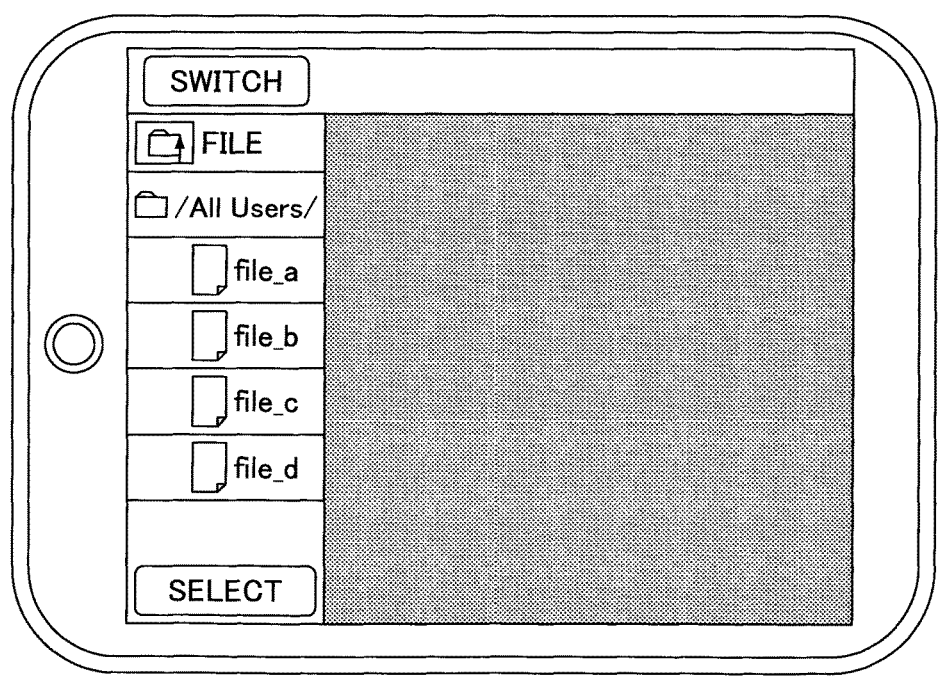
FIG. 18 is a drawing illustrating an example configuration of user group information.
FIG. 19 is a schematic view of an example of a file selection screen.

Further, a list of the groups is acquired from the file server 14 (in more detail, the smart device 13 acquires the information of the groups illustrated in FIG. 18 from the file server 14 via the relay server 11).

Figure 15:
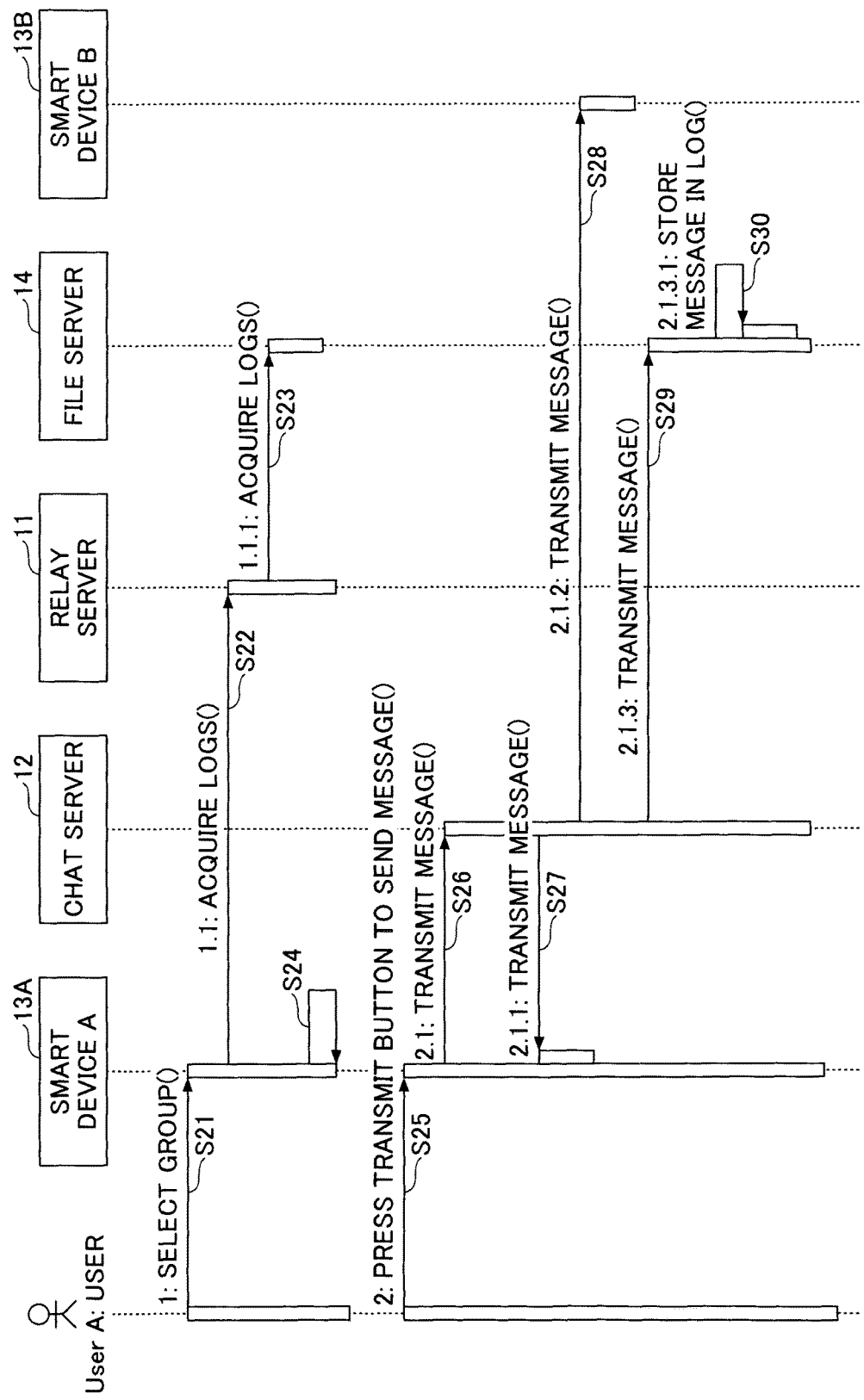
FIG. 15 is a sequence diagram of an example process of message transmission to a selected group.

After the group is selected, as illustrated in the sequence diagram of FIG. 15, for example, the smart device 13A of the User A acquires the logs of chat conversation content, and then transmits a message. FIG. 15 is a sequence diagram of an example process of message transmission to the selected group.

In step S21, the User A operates the smart device 13A to select the group to chat in the group selection screen as illustrated in FIG. 14, and presses the "start conversation" button. In steps S22 and S23, the smart device 13A sends a request to acquire logs of the selected group to the file server 14 via the relay server 11. Here, the logs which are required to be acquired refers to the logs of chat conversation content exchanged in the selected group so far.

Figure 16:
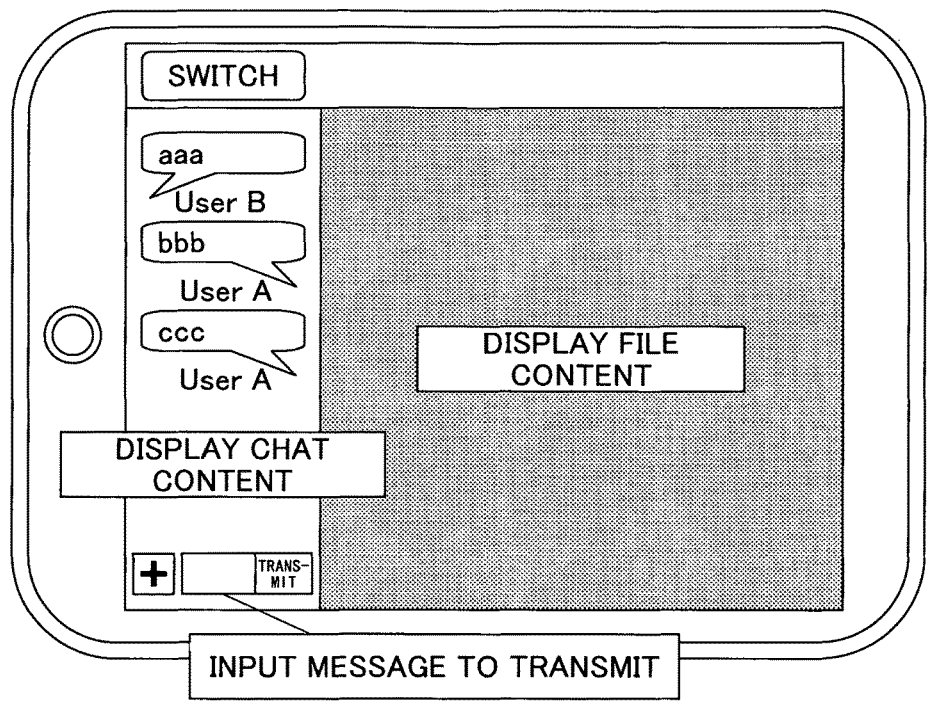
FIG. 16 is a schematic view of an example chat screen.

In step S24, for example, a chat screen as illustrated in FIG. 16 is displayed on the smart devices 13 of the users participating in the group to chat. FIG. 16 is a schematic view of an example of the chat screen.

In the chat screen of FIG. 16, the chat conversation content is displayed in the left part, and a box where a message to be transmitted can be input is disposed on the lower side of the part where the chat conversation content is displayed. Further, the content of the selected file is displayed on the right part in the chat screen of FIG. 16. For example, the smart device 13A displays the logs of chat conversation content so far in the left part of the chat screen of FIG. 16.

In step S25, the User A operates the smart device 13A to input a message in the box disposed in the left lower part of the chat screen, and presses a "transmit" button.

In step S26, the smart device 13A designates a group, and transmits the message to the chat server 12. The data transmission destination determination section 44 of the chat server 12 determines the smart device 13A of the User A and the smart device 13B of the User B who are participating in the chat of the designated group and the file server 14 as the transmission destinations of the message. As described, the chat server 12 determines that the file server 14 is one of the transmission destinations of the message. Here, the information that the group is associated with the file server 14 may be stored by the chat server 12, or may be generated based on, for example, a request designating a group from the file server 14.

In step S27, the chat server 12 transmits the message to the smart device 13A, so that the smart device 13A displays the message on the display section 21. Further, in step S28, the chat server 12 transmits the message to the smart device 13B, so that the smart device 13B displays the message on the display section 21.

In step S29, the chat server 12 transmits the message to the file server 14. In step S30, the file server 14 stores the message, which is received from the chat server 14, as the log.

Further, the file server 14 may automatically store the received message as the log of chat conversation content in association with the group. Further, the chat server 12 may send a request to store the log to the file server 14, so that the transmitted message can be stored as the log of chat conversation content in association with the group.

In step S29 in the sequence diagram of FIG. 15, it appears that the message is transmitted from the chat server 12 to the file server 14. However, in this case, it is necessary to pass through the FW 15.

To that end, for example, the chat server 12 can remain in a standby state where a request to acquire a message from the file server 14 is received, and transmit the message to the file server 14 as a response to the request to acquire the message. Further, the chat server 12 can transmit the message to the file server 14 via the FW 15 by using the relay server 11.

Figure 17:
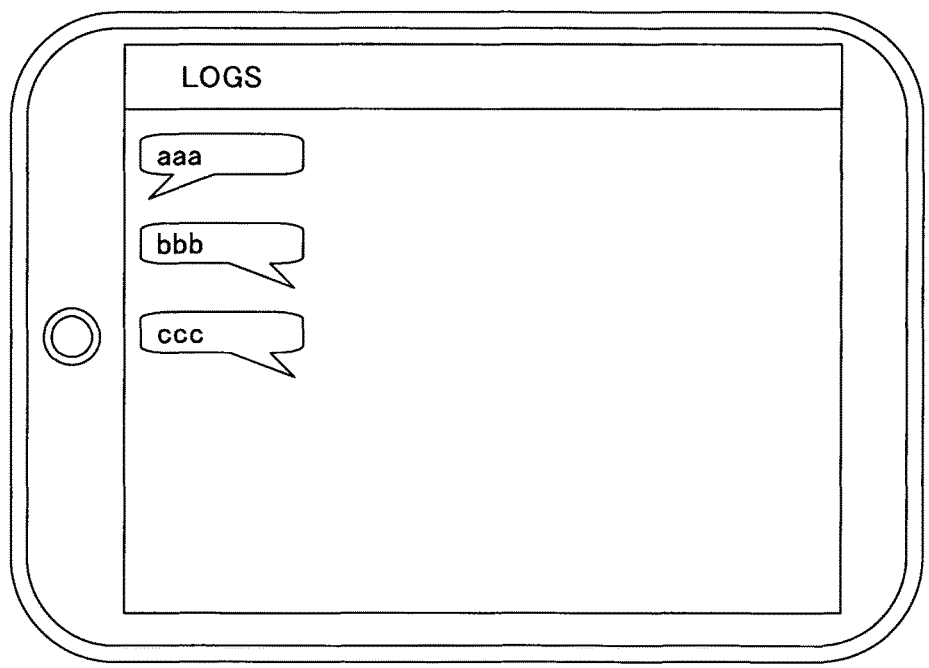
FIG. 17 is a schematic view of an example log screen.

The logs of chat conversation content stored in the file server 14 can be browsed by the users by displaying a log screen, which is exemplarily illustrated in FIG. 17, in the smart devices 13. FIG. 17 is a schematic view of an example of the log screen. Here, the logs of chat conversation content correspond to the group that the users using the smart devices 13 belong to.

The file server 14 can determine the group that the users using the smart devices 13 belong to by, for example, using user group information, as illustrated in FIG. 18, which is managed by the user group management section 63. FIG. 18 is a drawing illustrating an example configuration of the user group information.

For example, according to the user group information of FIG. 18, the logs of chat conversation content of "Group 1" can be browsed on the smart device 13A of the User A and the smart device 13B of the User B.

When the "Switch" button on the upper side of the chat screen is pressed, the smart device 13 acquires a list of the files from the file server 14, and displays a file selection screen as illustrated in FIG. 19. FIG. 19 is a schematic view of an example of the file selection screen.

Figure 20:
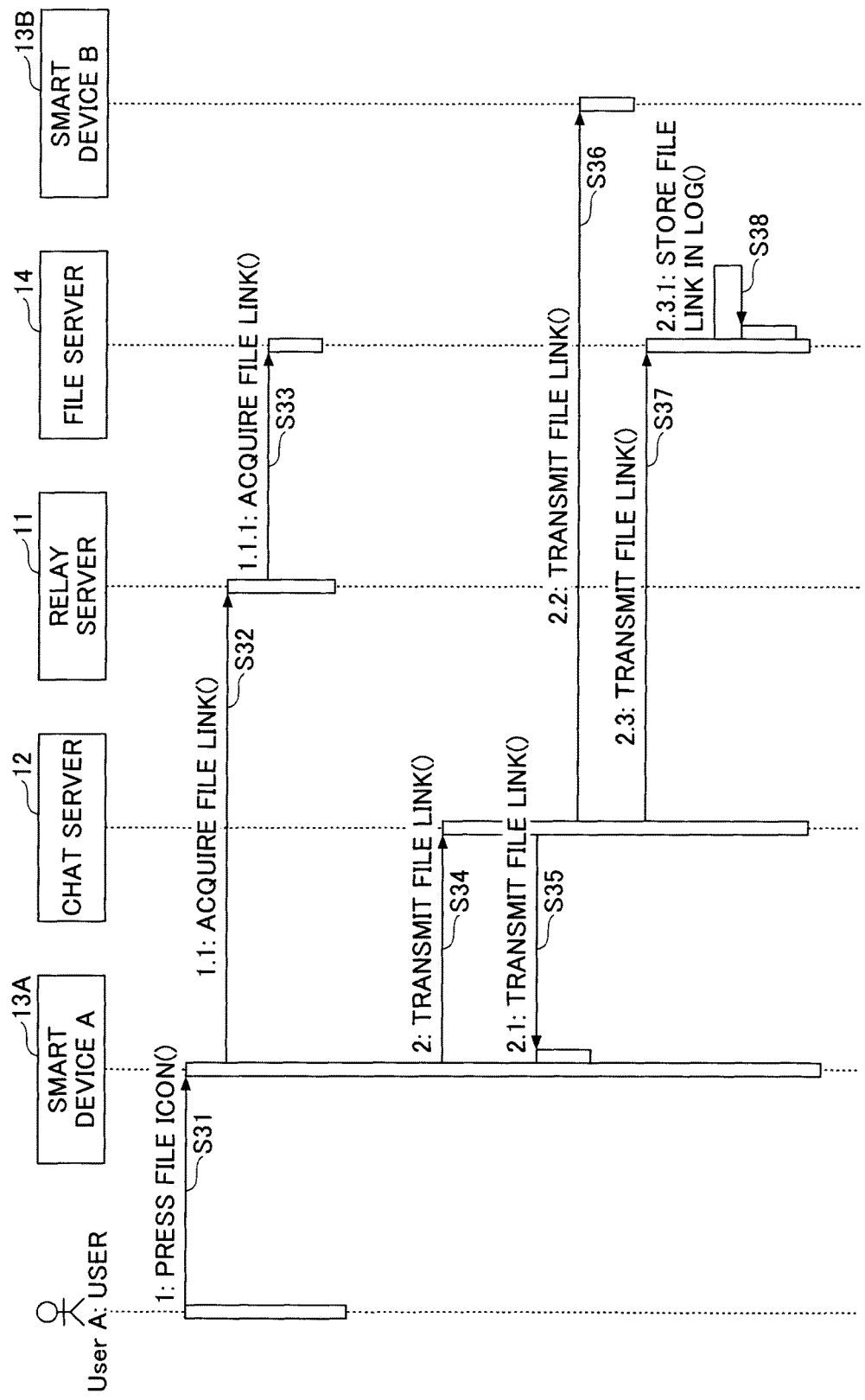
FIG. 20 is a sequence diagram of an example process of transmitting a file link to a selected group.

In the file selection screen of FIG. 19, the files in the list are displayed using file icons. From among the list of the files, a user selects a file icon corresponding to the file the content of which the user would like to display, and presses a "Select" button. When the file icon is selected, as illustrated in the sequence diagram of FIG. 20, for example, the smart device 13A acquires the file, and then transmits a file link. FIG. 20 is a sequence diagram of an example process of transmitting the file link to the selected group.

In step S31, the User A operates the smart device 13A to select a file icon of the file whose content is to be displayed from the list of the files displayed in the left lower side of the file selection screen of FIG. 19, and presses the "Select" button.

In steps S32 and S33, the smart device 13A sends an acquisition request to the file server 14 via the relay server 11 to acquire the file link corresponding to the selected file icon, and acquires the file link.

In step S34, the smart device 13A designates a group and transmits the file link to the chat server 12. The data transmission destination determination section 44 of the chat server 12 determines the smart devices 13A and 13B of the User A and the User B, respectively, and the file server 14 as the transmission destinations of the file link. As described, the chat server 12 determines the file server 14 as one of the transmission destinations of the file link.

In step S35, the chat server 12 transmits the file link to the smart device 13A, so that the smart device 13A displays the file link on the display section 21. Further, in step S36, the chat server 12 transmits the file link to the smart device 13B, so that the smart device 13B displays the file link on the display section 21. For example, by using the received file link, the smart devices 13A and 13B can display the file content, for example, on the right side of the chat screen as illustrated in FIG. 16.

In step S37, the chat server 12 transmits the file link to the file server 14. In step S38, the file server 14 can store the file link, which is received from the chat server 12, as the log.

Here, in the information processing system 1 according to an embodiment, it is also possible to prompt a user to select whether the logs of the chat conversation content are to be left in the file server 14. In the information processing system 1 according to an embodiment, whether the logs of the chat conversation content are to be left in the file server 14 is determined by a user in a procedure as illustrated in FIG. 21.

Figure 21:
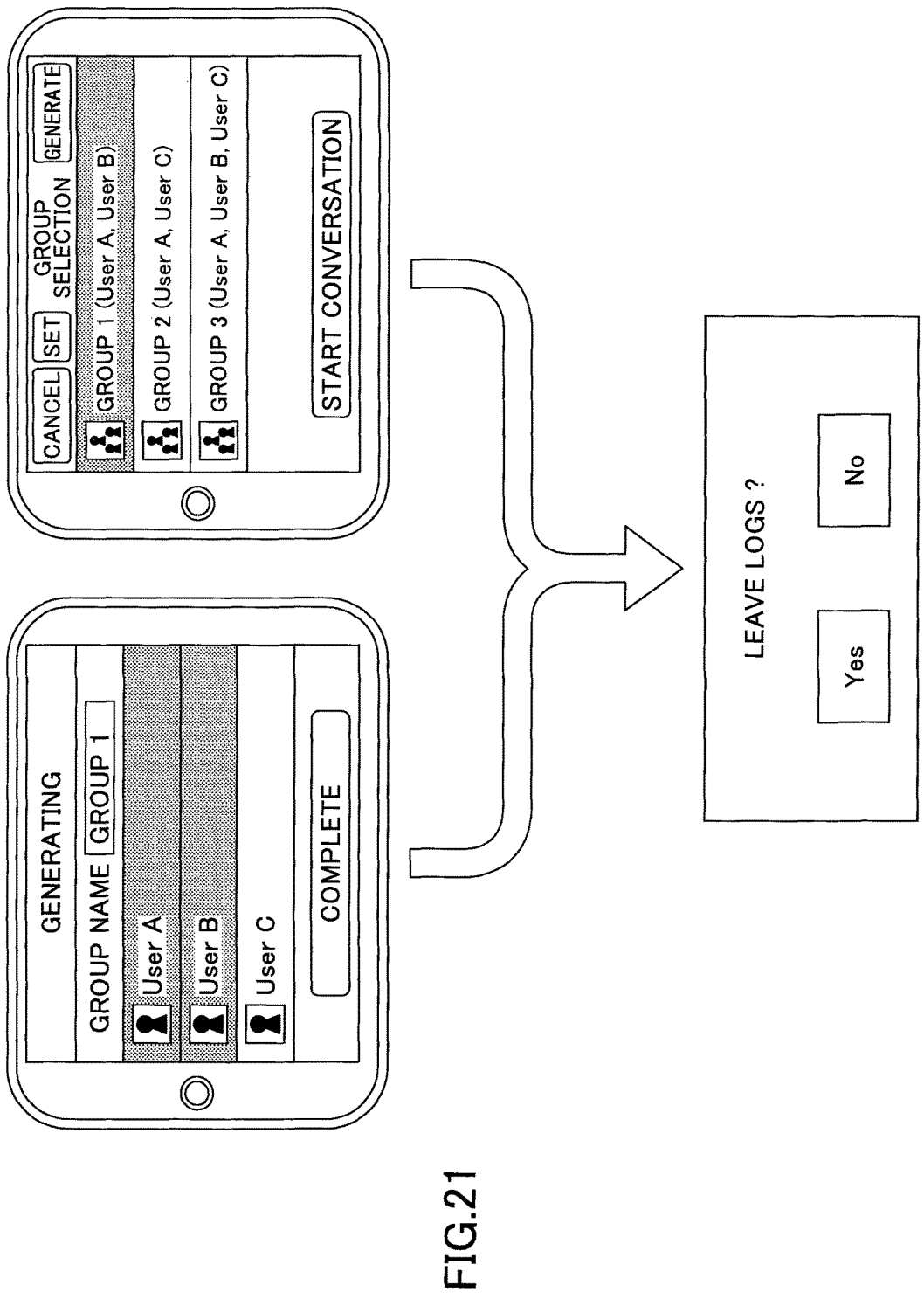
FIG. 21 is a drawing illustrating an example procedure of determining whether logs of chat conversation content are to be left in the file server.

FIG. 21 is a drawing illustrating an example procedure of determining whether the logs of chat conversation content are to be left in the file server. The timing when it is determined whether the logs of the chat conversation content are to be left in the file server 14 is set, for example, after a group is generated using the group generation screen of FIG. 13 and after the group is selected using the group selection screen of FIG. 14.

Further, the timing when it is determined whether the logs of the chat conversation content are to be left in the file server 14 may be set after a set (generate) button is pressed which is provided on the group selection screen of FIG. 14 and is to set whether the logs of the chat conversation content are to be left in the file server 14.

As for the timing to set whether the logs of the chat conversation content are to be left in the file server 14, a screen to prompt a user to select whether the logs are to be left is displayed on the display section 21 of the smart device 13. A user can select whether the logs of the chat conversation content are to be left in the file server 14 using the screen which prompts the user to select whether the logs of the chat conversation content are to be left as illustrated in FIG. 21.

An example of the user group information in the case where a user is prompted to select whether the logs of the chat conversation content are to be left in the file server 14 is illustrated in FIG. 22. FIG. 22 is a drawing illustrating another example configuration of the user group information. The user group information of FIG. 22 is the same as that of FIG. 18 except that a log storage destination is added.

In the user group information of FIG. 22, it is possible to set the log storage destination for each of the groups. For example, if the logs of the chat conversation content of a group is set not to be left in the file server 14, the file server 14 is not set as the storage destination of the group. The "group 2" in FIG. 22 is a group for which the logs of the chat conversation content of the group are not to be left in the file server 14.

As the storage destination of the group for which the logs of the chat conversation content are set to be left in the file server 14, the file server 14 is set. The "group 1" and the "group 3" in FIG. 22 are groups for which the logs of the chat conversation content of the group are to be left in the file server 14.

Accordingly, in the information processing system 1 according to an embodiment, it is possible for a user to select whether the logs of the chat conversation content are to be left in the file server 14. When a user wishes to leave the logs of the chat conversation content in the file server 14, the user may select to leave the logs of the chat conversation content in the file server 14. On the other hand, when a user wishes not to leave the logs of the chat conversation content in the file server 14, the user may select not to leave the logs of the chat conversation content in the file server 14.

Further, in the information processing system 1 according to an embodiment, it is also possible to add a user to a group later. In the information processing system 1 according to an embodiment, it is possible to add a user to a group later based on, for example, the procedure as illustrated in FIG. 23.

Figure 23:
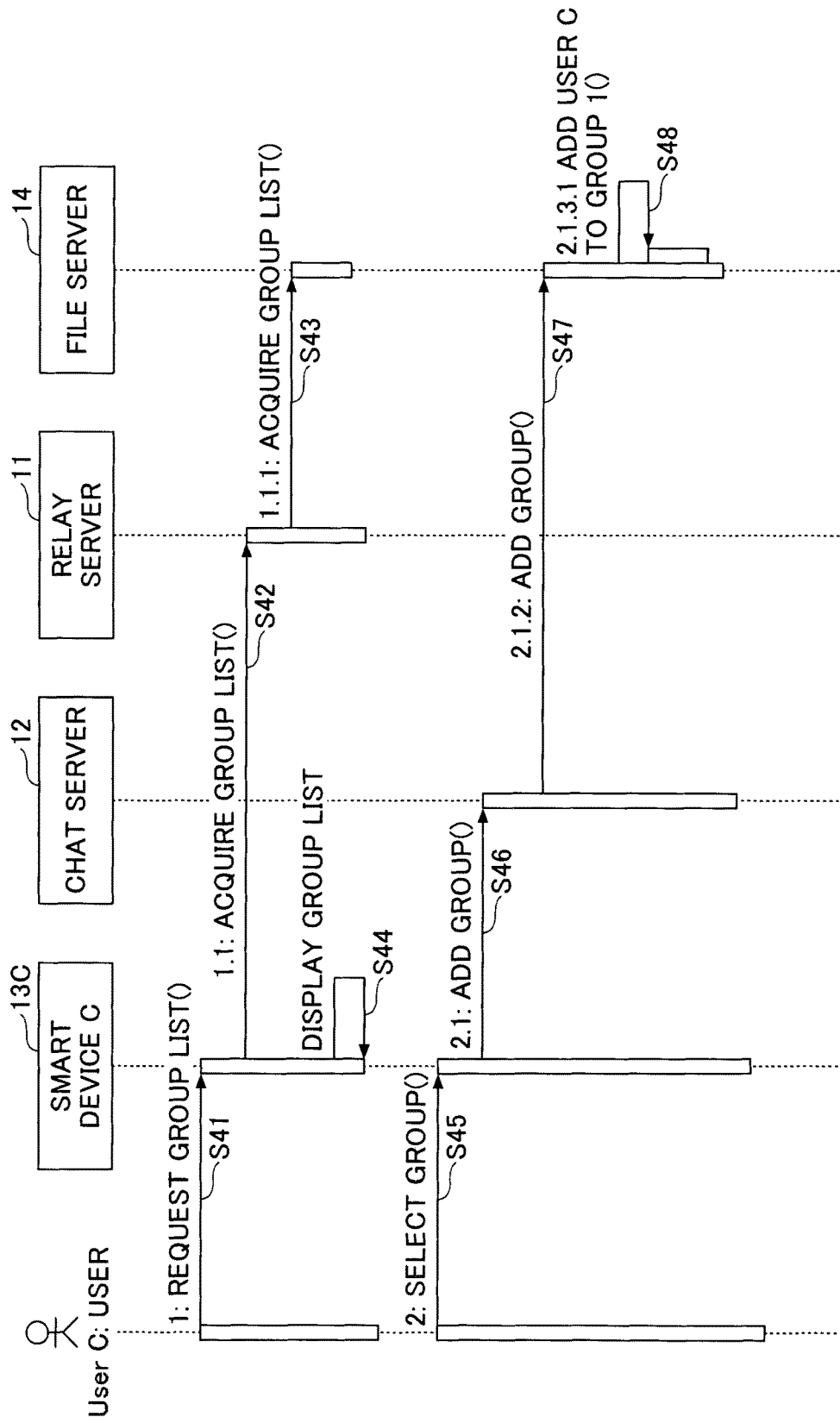
FIG. 23 is a sequence diagram of an example process of adding a user to a group later.

FIG. 23 is a sequence diagram of an example process of adding a user to a group later. In step S41, a User C operates the smart device 13C to request to acquire the list of the groups in which the User C can participate later.

In steps S42 and S43, the smart device 13C sends a request to acquire the list of the groups in which the User C can participate later (and in which the User C does not currently participate) to the file server 14 via the relay server 11, and acquires the list of the groups.

Figure 24:
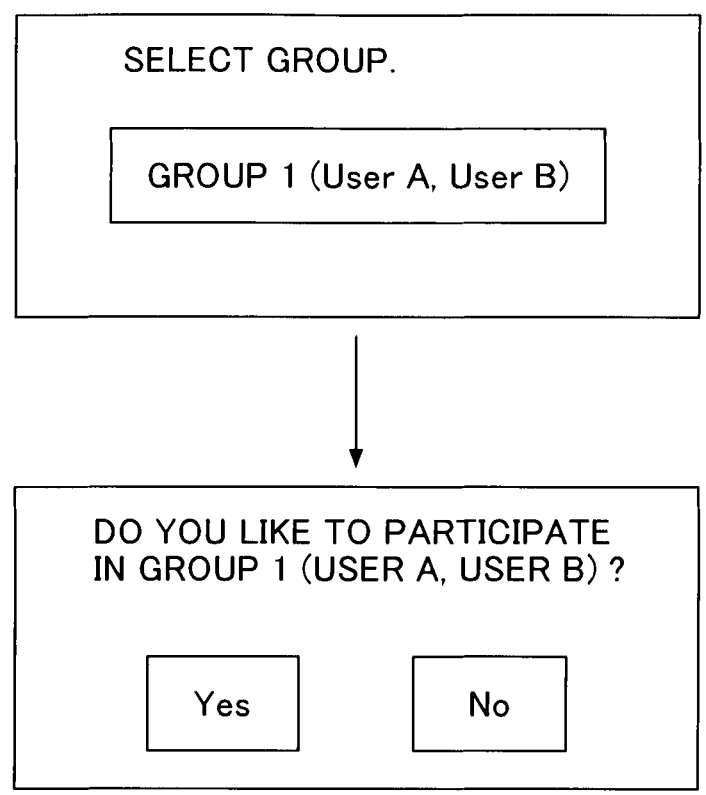
FIG. 24 is a drawing illustrating an example procedure of adding a user to a group later.

In step S44, for example, such a group selection screen as illustrated in the upper part of FIG. 24 is displayed on the smart device 13C of the User C. FIG. 24 is a drawing illustrating an example procedure of adding a user to a group later.

In the group selection screen in the upper part of FIG. 24, the group 1 is displayed as the group in which the User C can participate later. In step S45, the User C operates the smart device 13C to select the group 1 in the group selection screen as exemplarily illustrated in the upper part of FIG. 24. Then, a confirmation screen as illustrated in the lower part of FIG. 24 is displayed on the smart device 13C. The User C can request to add oneself to the group 1 by pressing the "Yes" button in the confirmation screen.

In step S46, the smart device 13C designates the group 1 and sends a request to be added to the group to the chat server 12. In step S47, the chat server 12 transmits the request, in which the group 1 is designated, to be added to the group to the file server 14. In step S48, the file server 14 can add the User C to the group 1 based on the request, in which the group 1 is designated, to be added to the group.

The smart device 13C of the User C having been added to the group 1 can acquire the logs of the chat conversation content exchanged (shared) in the group 1 based on the procedure as illustrated in the sequence diagram of FIG. 15, and display the chat screen as illustrated in FIG. 16.

However, in a case where it is selected, in the group 1, not to leave the logs of the chat conversation content in the file server 14, a part of the logs of the chat conversation content exchanged in the group 1 so far cannot be displayed in the chat screen.

Figure 25:
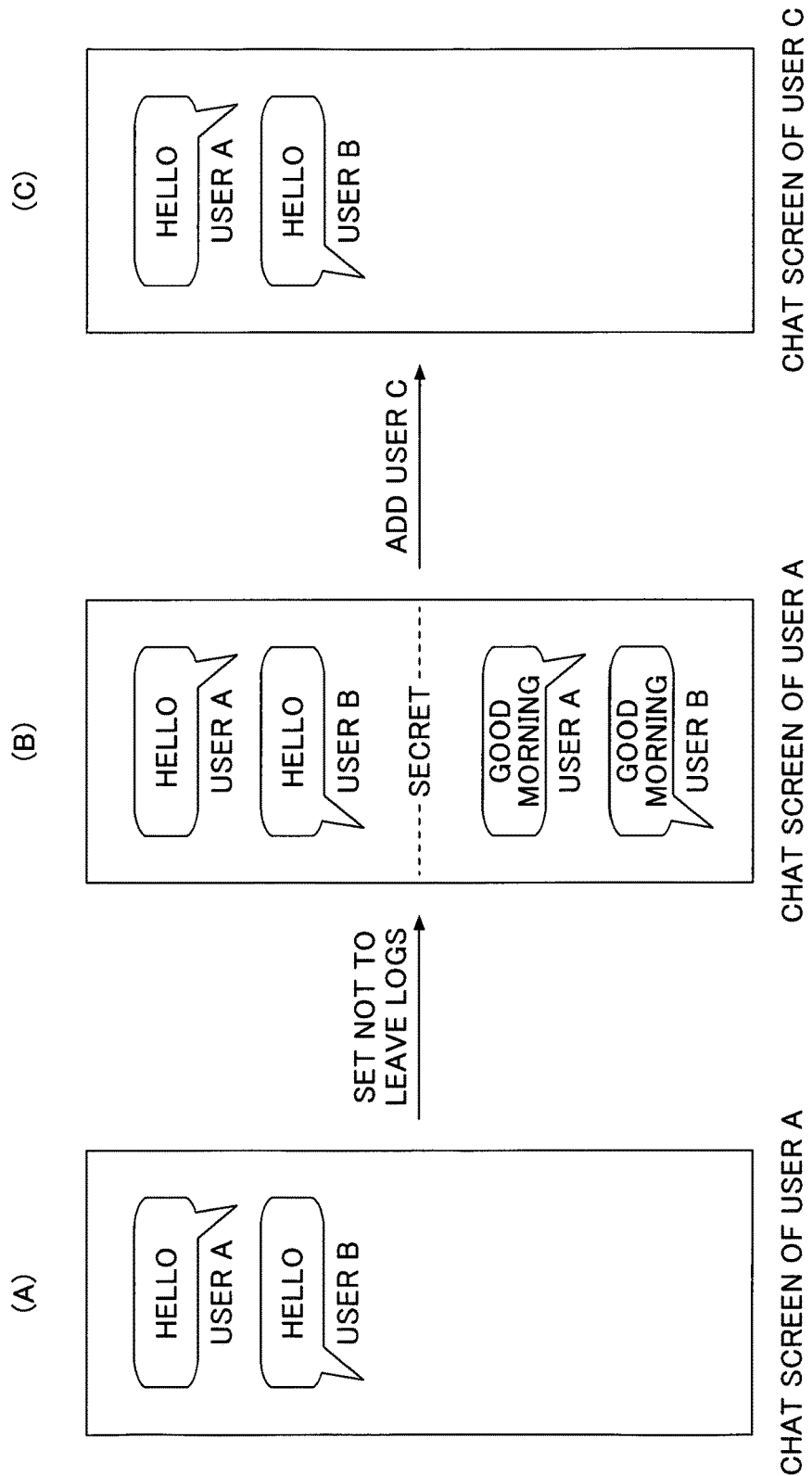
FIG. 25 is a schematic view of an example difference between a chat screen of a user "A" who has already participated and a chat screen of a user "B" who participated later.

FIG. 25 is a schematic view of an example difference between the chat screen of a User A who has already participated in and the chat screen of a User C who participated later. Part (A) of FIG. 25 is an example of the chat screen displayed on the smart device 13A of the User A. In the chat screen in part (A) of FIG. 25, messages "Hello" transmitted by the Users A and B are displayed.

After the chat screen in part (A) of FIG. 25 is displayed, it is assumed that, for example, the User A operates the smart device 13A to set not to leave the logs of the chat conversation content in the file server 14.

After the setting not to leave the logs of the chat conversation content in the file server 14, it is assumed that a message "Good morning" is transmitted by the Users A and B. The chat screen in part (B) of FIG. 25 is an example of the chat screen displayed on the smart device 13A of the User A. In the chat screen in part (B) of FIG. 25, the messages "Hello" by the Users A and B are displayed.

After the chat screen in part (B) of FIG. 25 is displayed, it is assumed that, for example, the User C operates the smart device 13C to participate in the group 1 later. The chat screen in part (C) of FIG. 25 is an example of the chat screen displayed on the smart device 13C of the User C who participated in the group 1 later. The chat screen in part (C) of FIG. 25 is displayed based on the logs which are acquired from the file server 14 based on the procedure illustrated in the sequence diagram of FIG. 15. Here, the messages "Good morning", by the Users A and B, displayed in the chat screen in part (B) of FIG. 25 are the messages exchanged after the setting not to leave the logs of the chat conversation content in the file server. Therefore, the messages "Good morning", by the Users A and B, are not displayed in the chat screen in part (C) of FIG. 25.

As described above, in the information processing system 1 according to an embodiment, by switching the setting whether the messages are to be left as the logs, it becomes possible to select the messages to be displayed on the chat screen of the user who participates in the group later.

Second Embodiment

In the information processing system 1 according to the first embodiment, the logs of the chat conversation content which are exchanged among the smart devices 13 which are paired with a single file server 14 are stored in the file server 14.

In the information processing system 1A according to a second embodiment, the logs of the chat conversation content which are exchanged among the smart devices 13 which are paired with a plurality of file servers 14A and 14B are stored in the file servers 14A and 14B.

Here, the information processing system 1A in the second embodiment is similar to the information processing system in the first embodiment except for a part. Therefore, the repeated descriptions may be omitted.

System Configuration

Figure 26:
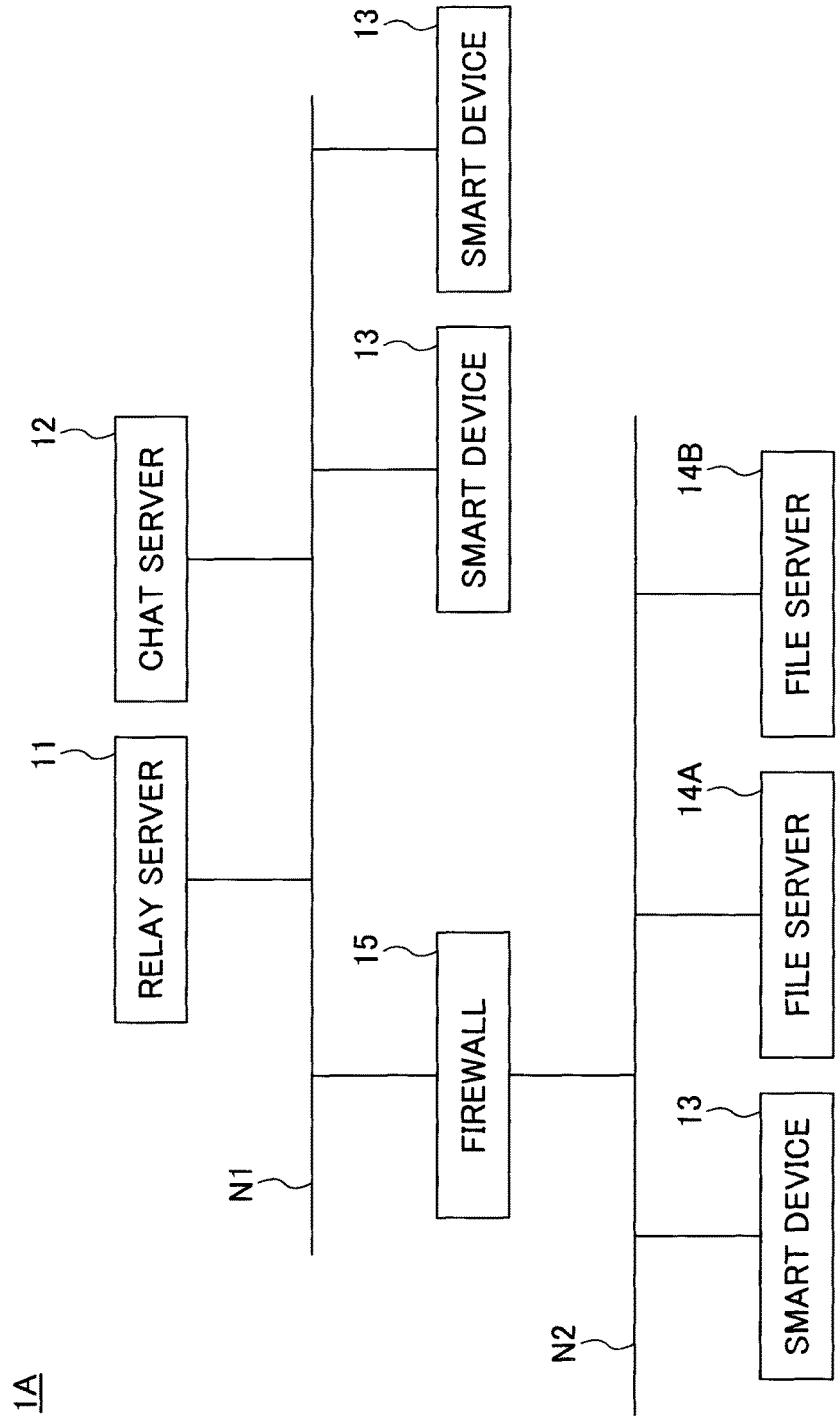
FIG. 26 is a drawing illustrating another example configuration of the information processing system according to an embodiment.

FIG. 26 is a drawing illustrating an example configuration of the information processing system 1A according to the second embodiment. As illustrated in FIG. 26, the configuration of the information processing system 1A in the second embodiment differs from the configuration of the information processing system 1 in the first embodiment in that there are two file servers 14A and 14B in place of the file server 14. Here, it is possible for the smart devices 13 to be paired with one of the file servers 14A and 14B or both. Elements other than the file servers 14A and 14B in the information processing system 1A are similar to the elements in the information processing system 1. Therefore, the repeated descriptions thereof are herein omitted. Further, the hardware configuration and the software configuration in the information processing system 1A are similar to those in the information processing system 1 of FIG. 1. Therefore, the repeated descriptions thereof are also omitted.

Details of Processes

Here, details of the processes performed by the information processing system 1A according to this embodiment are described.

The device registration (i.e., the process of registering the device) is performed similar to the process in the first embodiment. In the following description, the smart devices used by the Users A, B, C, and D are called the smart devices 13A, 13B, 13C, and 13D, respectively. Further, it is assumed that the smart device 13A is paired with file servers 14A and 14B (i.e., the pairing is made between the smart device 13A and the file servers 14A and 14B); the smart device 13B is paired with the file server 14B; the smart device 13C is paired with the file server 14B; and the smart device 13D is paired with the file server 14A.

Group Generation and Chat Processes

Figure 27:
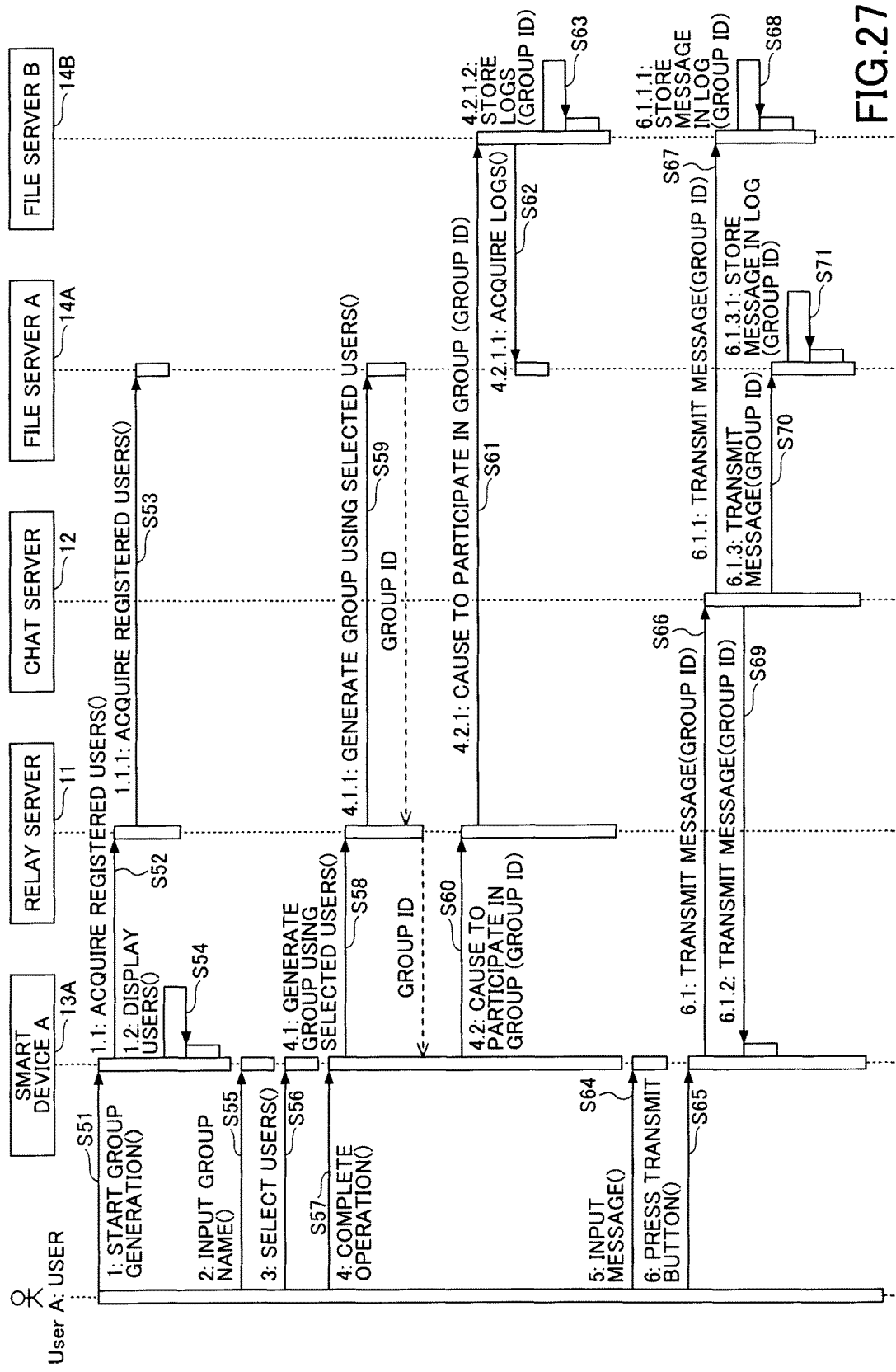
FIG. 27 is a sequence diagram of example processes of the group generation process and a message transmission process.

FIG. 27 is a sequence diagram of example processes of the group generation process and the message transmission. In the information processing system 1A as well, it is necessary to generate a group in which the chat conversation content is transmitted (exchanged) similar to the information processing system 1 according to the first embodiment.

In step S51, the User A operating the smart device 13A instructs the smart device 13A to start the group generation. In steps S52 and S53, the smart device 13A sends a request to acquire the information of the users who can participate in chat to the file server 14A via the relay server 11. In step S54, the smart device 13A displays the group generation screen as illustrated in FIG. 13 by using the acquired information of the users who are already registered.

In step S55, the User A operates the smart device 13A to input a group name in the group generation screen. Further, in step S56, the User A operates the smart device 13A to select users who can participate in the group in the group generation screen. In step S57, the User A operates the smart device 13A to perform the complete operation by pressing the "complete" button in the group generation screen.

When the complete operation is performed by the User A, the process goes to step S58. In step S58, the smart device 13A sends a request to the file server 14A to generate a group by using the group name, which is input in step S55, and the users who are selected in step S56. In step S59, the request to generate the group from the smart device 13A is transmitted from the relay server 11 to the file server 14A.

The file server 14A having received the request to generate the group generates the group by using the group name, which is input in step S55, and the users who are selected in step S56, and manages the group in association with the users. Further, the file server 14A transmits the group ID of the generated group to the smart device 13A.

The smart device 13A is paired with not only the file server 14A but also the file server 14B. Therefore, the group ID of the generated group is reported (notified) to the file server 14B, so that the file server 14B can participate in the group. By causing the file server 14B to participate in the group of the file server 14A, it becomes possible for the information processing system 1A to store the logs of the chat conversation content, which are stored in the file server 14A, in the file server 14B as well.

In steps S60 and S61, the smart device 13A designates the group ID and sends a request along with the designated group ID to participate in the group to the file server 14B via the relay server 11. Then, in steps S62 and S63, the file server 14B sends a request to acquire the logs of the group, which is designated by the group ID, to the file server 14A, and acquires and store the logs.

Figures 28, 29:
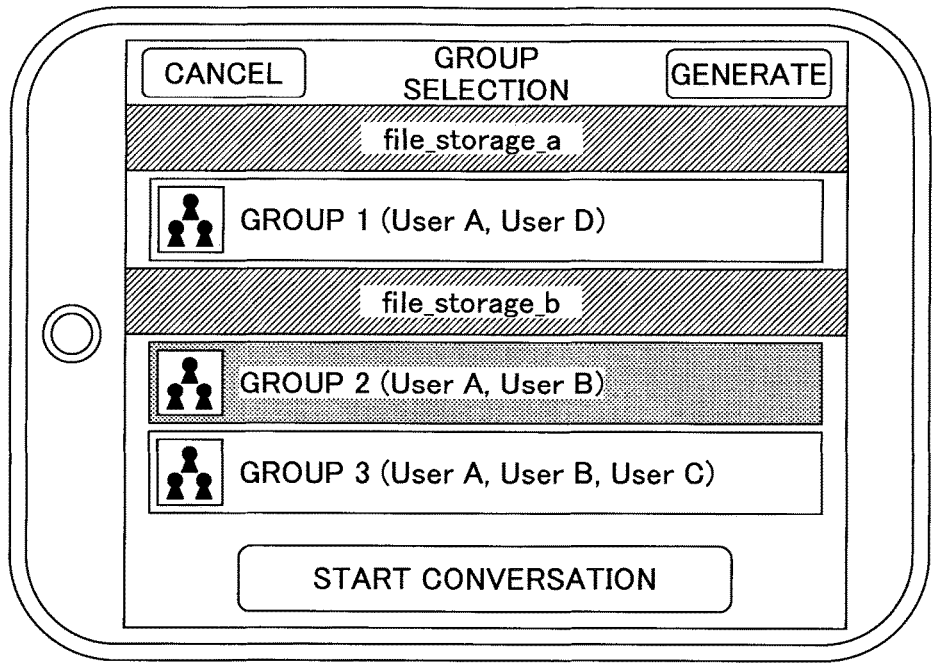
FIG. 28 is a schematic view of an example of a group selection screen for chatting.
FIG. 29 is a drawing illustrating an example configuration of request reception management information.

After that, the User A selects a group for chatting in the group selection screen as illustrated in FIG. 28, and presses the "start conversation" button. FIG. 28 is a schematic view of an example of the group selection screen for chatting. The information of the groups displayed on the group selection screen can be acquired from the file servers 14A and 14B.

In the group selection screen of FIG. 28, it is possible to select a group from among the "Group 1" of the file server 14A and the "Group 2" and the "Group 3" of the file server 14B. Here, it is assumed that the User A selects the "Group 1" of the file server 14A and presses the "start conversation" button. When the "start conversation" button is pressed, as illustrated in the sequence diagram of FIG. 15, the smart device 13A acquires the logs of the chat conversation content, and transmits a message.

In step S64, the User A operating the smart device 13A inputs a message in the box displaced in the left lower part of the chat screen as illustrated in FIG. 16, and presses the "transmit" button in step S65.

In step S66, the smart device 13A designates the group and transmits a message to the chat server 12. The data transmission destination determination section 44 of the chat server 12 determines the smart device 13A of the User A who is participating in the designated group and the file servers 14A and 14B as the transmission destinations of the message. As described above, the chat server 12 determines the file servers 14A and 14B as the transmission determinations of the message.

The chat server 12 can determine the transmission destinations of the message by, for example, storing request reception management information as illustrated in FIG. 29. FIG. 29 is a drawing illustrating an example configuration of the request reception management information. For example, the file server 14A is registered as a request reception user of the "Group 1" when the User A generates the "Group 1" and then a request to participate in the "Group 1", etc., is transmitted to the chat server 12.

Further, the file server 14B is registered as a request reception user of the "Group 1" when the User A generates the "Group 1" and a request to participate in the "Group 1", etc., is transmitted to the chat server 12.

In step S67, the chat server 12 transmits the message to the file server 14B. In step S68, the file server 14B stores the message, which is received from the chat server 12, as a log. In step S69, the chat server 12 transmits the message to the smart device 13A, so that the message is displayed on the display section 21 of the smart device 13A.

In step S70, the chat server 12 transmits the message to the file server 14A. In step S71, the file server 14A can store the message, which is received from the chat server 12, as a log.

In the sequence diagram of FIG. 27, similar to the sequence diagram of FIG. 15, in steps S67 and S70, it appears that the message is transmitted from the chat server 12 to the file servers 14B and 14A, respectively. However, it is necessary to take an appropriate step (method) to pass through (go beyond) the firewall (FW) 15.

Figures 30, 31:
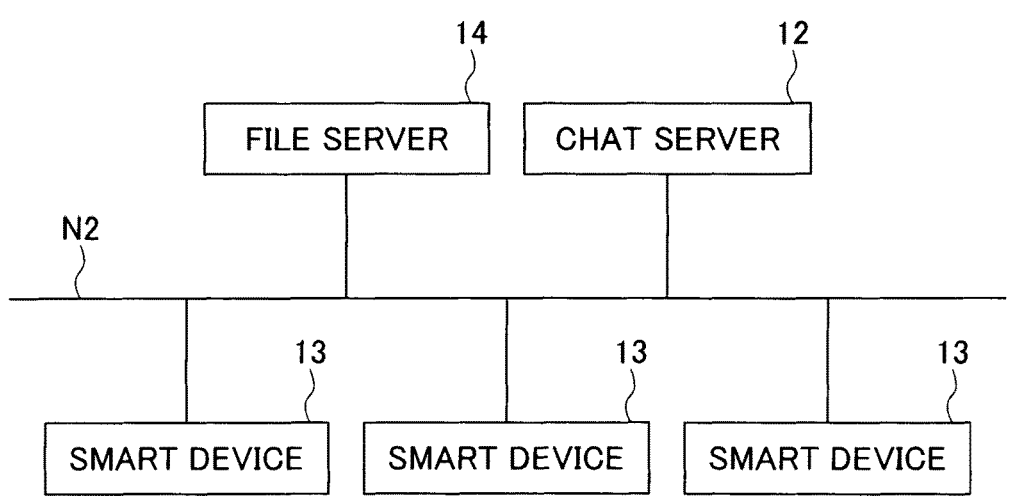
FIG. 30 is a drawing illustrating an example of user group information.
FIG. 31 is a drawing illustrating still another example configuration of the information processing system according to an embodiment.

The logs of the chat conversation content stored in the file server 14A and 14B correspond to the group to which the users belong using the smart devices 13. For example, by using the user group information, as illustrated in FIG. 30, managed by the user group management section 63, the file serves 14A and 14B can determine the group to which the users belong using the smart devices 13. FIG. 30 is a drawing illustrating an example of the user group information.

The user group information illustrated in the upper part of FIG. 30 is included in the file server 14A. The user group information illustrated in the lower part of FIG. 30 is included in the file server 14B.

For example, according to the user group information of FIG. 30, the logs of the chat conversation content of the "Group 1" can be browsed by the smart device 13A used by the User A and the smart device 13D used by the User D.

Further, according to the user group information of FIG. 30, the logs of the chat conversation content of the "Group 2" can be browsed by the smart device 13A used by the User A and the smart device 13B used by the User B. Further, as illustrated in the sequence diagram of FIG. 27, in the information processing system 1A, the smart device 13A is paired with the file servers 14A and 14B. Therefore, the logs of the chat conversation content of the "Group 2" are stored in the file server 14A as well.

The smart device 13A is paired with the file servers 14A and 14B. Therefore, the smart device 13A can display the logs of the chat conversation content of the "Group 2" stored in the file servers 14A and 14B. On the other hand, since the smart device 13B is not paired with the file server 14A, the smart device 13B cannot display the logs of the chat conversation content of the "Group 2" stored in the file server 14A.

Further, similar to the information processing system 1 according to the first embodiment, in the information processing system 1A in this embodiment, it is possible to cause a user to select whether the logs of the chat conversation content are to be stored in the file servers 14A and 14B.

Another System Configuration

Note that the configurations of the information processing system 1 and 1A as illustrated in FIGS. 1 and 26, respectively, are examples only. For example, a configuration as illustrated in FIG. 31 is another example. FIG. 31 is a drawing illustrating another example configuration of the information processing system according to an embodiment.

In an information processing system 1B of FIG. 31, the chat server 12, a plurality of the smart devices 13, and the file server 14 are connected to the network N2 such as a LAN, etc. In the information processing system 1B of FIG. 31, there is no communication that passes through the FW 15, the relay server 11 is omitted (removed). Even in the information processing system 1B of FIG. 31, it is still possible to perform the processes similar to those in the information processing systems 1 and 1A as described above. Further, in the information processing system 1B of FIG. 31, the chat sever 12 and the file server 14 may be integrated into a single unit.

FIG. 33 illustrates another embodiment of the message transmission process. Here, it is assumed that there are Users A, B, and C who belong to the group and use smart devices 13A, 13B, and 13C, respectively.

The smart device 13A receives an instruction to start up an application from the User A, and starts up the application (in steps S401 and S402). Further, the smart device 13B receives an instruction to start up an application from the User B, and starts up the application (in steps S403 and S404). Further, the smart device 13 may display a log-in screen when starting up the application so as to cause a user to input user identification information (information to identify the user such as the user ID). Otherwise; the application may store the user identification information in advance. By doing this, the smart device 13 stores the user identification information in association with the application.

When the applications are started up, the smart device 13A and the smart device 13B transmit an acquisition request to acquire messages, which are for the users (Users A and B) identified based on the user identification information, to the chat server 12 by using the user identification information in association with the applications (steps S405 and S406). The chat server 12 determines whether the chat server (message) for the users (Users A and B) indicated by the acquisition request is received. When determining that the message is not received, the chat server 12 transmits the information indicating that there is no message (message reception result) to the smart device 13A and the smart device 13B (steps S407 and S408). Further, preferably, the smart device 13 repeatedly sends the acquisition request to acquire the message reception result in steps S405 through S408.

Further, similar to the smart device 13A and the smart device 13B, the file server 14 transmits the acquisition request to acquire the message to the group to which the file server 14 belongs (steps S490 and S491), and receives the message from the chat server 12 (steps S493 and S494).

Next, the smart device 13A receives an instruction to start the function of the message, and display the list of the groups (steps S409 through S414). The smart device 13A receives the selection of the group from among the displayed groups (step S415), and displays a message screen of the group (step S416).

Next, the smart device 13A receives a message transmission instruction (step S417), and then transmits message information to the chat server 12 (step S418). Here, the message information in this embodiment includes the information that identifies the file server 14.

The chat server 12 acquires the information of the group included in the message information from the file server 14 (steps S419 through S422), and determines a distribution destination of the message (step S423). Here, the chat server 12 transmits the message information to the smart device 13A, the smart device 13B, and the file server 14 which transmitted the acquisition request to acquire the message (steps S424 through S431). The smart device 13A and the smart device 13B display the received message on the respective display devices (steps S432 and S433). On the other hand, the file server 14 stores the receive message in association with the information of the group (i.e., information of the users who belong to the group) (step S434). Then, the chat server 12 deletes the messages (step S435).

On the other hand, upon receiving an instruction to start up an application, the smart device 13C starts up the application (step S436 and S437). When the application is started up, the smart device 13C transmits an acquisition request to acquire a message to the file server 14, and acquires the message stored in the file server 14 (steps S438 through S441).

In the above description, a case is described where it is only the smart device 13c that causes the file server 14 to check the message. However, the present invention is not limited to this. Namely, the smart devices 13A and 13B may also be arranged to transmit the acquisition request. Further, the acquisition request may be transmitted to the file server 14 not when the application is started up but when the instruction to start a message function is received or when the message screen is displayed (when the selection of the group is received).

Further, when the distribution destination is identified in step S423, the chat server 12 may notify the smart devices 13A through 13C, which are the distribution destinations, via a notification server.

As described above, since the message is not stored in the chat server 12 (i.e., on a public network) but is stored in the file server 14 (i.e., a sever on a local network), it becomes possible to enhance the security in transmitting and receiving the messages.

SUMMARY

According to an embodiment, the exchanges of the messages which require real-time characteristics among functions in chat are performed by the chat server 12 which is provided (installed) in a global network. Further, according to an embodiment, the storage of the logs and the group management, in which security is more desired to be secured than the real-time characteristics among the functions in chat, are performed by the file server 14 provided in a local network.

According to an embodiment, it becomes possible to resolve the problems in a conventional chat server which stores logs, the problems including that the security of the logs cannot be guaranteed when the chat server is provided on a global network and that the real-time characteristics cannot be obtained when the chat server is provided on a local network.

As described above, in an information processing system 1 such as a chat system according to an embodiment of the present invention, it becomes possible to secure not only the real-time characteristics and but also the security of the logs.

Although the invention has been described with respect to specific embodiments for a complete and clear disclosure, the appended claims are not to be thus limited but are to be construed as embodying all modifications and alternative constructions that may occur to one skilled in the art that fairly fall within the basic teachings herein set forth.

Further, the smart device 13 is an example of an information terminal. The chat server 12 is an example of an information processing apparatus. The file server 14 is an example of an information storage apparatus. The relay server 11 is an example of a relay apparatus. The network N1 is an example of the global network. The network N2 is an example of the local network.

Note that a scope of the present invention is not limited by the embodiments described above and by the configurations as illustrated in FIGS. 1, 26, and 31. For example, the relay server 11, the chat server 12, and the file server 14 in the information processing systems 1, 1A, and 1B may be provided, by one or more computers, and the functions of the servers may be integrated into any of the computers as long as the functions can be realized as described above.

The present application is based on and claims the benefit of priority of Japanese Patent Application Nos. 2014-075114 filed Apr. 1, 2014 and 2015-061024 filed Mar. 24, 2015, the entire contents of which are hereby incorporated herein by reference.

DESCRIPTION OF THE REFERENCE NUMERALS 1, 1A, 1B: INFORMATION PROCESSING SYSTEM
11: RELAY SERVER
12: CHAT SERVER
13, 13A-13D: SMART DEVICE
14, 14A, 14B: FILE SERVER
15: FIREWALL
21: DISPLAY SECTION
22: OPERATION RECEPTION SECTION
23: TWO-DIMENSIONAL CODE READING SECTION
24: IMAGE INFORMATION GENERATION SECTION
25: IMAGE GENERATION SECTION
26: SETTING STORAGE SECTION
27: DATA TRANSMISSION SECTION
28: DATA RECEIVING SECTION
29: FILE MANAGEMENT SECTION
30: TEXT INFORMATION GENERATION SECTION
41: DATA TRANSMISSION SECTION
42: DATA RECEIVING SECTION
43: USER GROUP MANAGEMENT SECTION
44: DATA TRANSMISSION DESTINATION DETERMINATION SECTION
51: DATA RECEIVING SECTION
52: DATA STORAGE SECTION
53: REQUEST RECEIVING SECTION
54: DATA DETERMINATION SECTION
55: DATA TRANSMISSION SECTION
61: DATA TRANSMISSION SECTION
62: DATA RECEIVING SECTION
63: USER GROUP MANAGEMENT SECTION
64: FILE MANAGEMENT SECTION
65: LOG MANAGEMENT SECTION
66: REQUEST INQUIRY SECTION
67: REQUEST PROCESSING SECTION

100: COMPUTER
101: INPUT DEVICE
102: DISPLAY DEVICE
103: EXTERNAL I/F
103A: RECORDING MEDIUM
104: RAM
105: ROM
106: CPU
107: COMMUNICATION I/F
108: HDD
B: BUS
N1, N2: NETWORK

PRIOR ART DOCUMENTS

Patent Document

[Patent Document 1] Japanese Laid-open Patent Publication No. 2011-209926

The invention claimed is:

1. An information processing system comprising:
a plurality of information terminals;
an information processing apparatus; and
an information storage apparatus,
wherein the information processing apparatus is connected to a first network and the information storage apparatus is connected to a second network, said first and second networks being connected each other via a firewall,
wherein the information processing apparatus includes
a receiving unit configured to receive information that is transmitted from one of the plurality of information terminals, and
a transmission unit configured to transmit the information, which is received by the receiving unit, to one or more other information terminals and the information storage apparatus,
wherein each of the plurality of information terminals includes
a transmission unit configured to transmit the information to the information processing apparatus, and
a receiving unit configured to receive information which is transmitted from the information processing apparatus,
wherein the information storage apparatus includes
a storage unit configured to store the information which is transmitted from the information processing apparatus,
wherein a first information terminal and a second information terminal of the plurality of information terminals are configured to participate in a group in which chat messages are transmitted,
wherein, after the chat messages are transmitted in the group in which the first information terminal and the second information terminal participate, a third information terminal of the plurality of information terminals is configured to participate in the group, and
wherein the first information terminal is configured to select whether the chat messages transmitted before the third information terminal participates in the group are to be displayed on a screen of the third information terminal.

2. The information processing system according to claim 1,
wherein the information processing apparatus further includes
a transmission destination determination unit configured to determine the information terminals which belong to a group which shares information therein and the information storage apparatus as transmission destinations of the information which is received by the receiving unit of the information processing apparatus.

3. The information processing system according to claim 2,
wherein the transmission destination determination unit is configured to determine that the information storage apparatus is not one of the transmission destinations of the information which is received by the receiving unit of the information processing apparatus in a case where the information storage apparatus is not set in association with the group.

4. The information processing system according to claim 2,
wherein the transmission destination determination unit is configured to, when the information processing system includes a plurality of the information storage apparatuses, determine the information terminals which belong to the group which shares the information therein and the plurality of information storage apparatuses which also belong to the group which shares the information therein as the transmission destinations of the information which is received by the receiving unit of the information processing apparatus.

5. The information processing system according to claim 4,
wherein the plurality of information terminals are required to be registered in the information storage apparatus in order to acquire information stored in the information storage apparatus, and
wherein the transmission destination determination unit is configured to, when the information processing system includes the plurality of information storage apparatuses, determine the information storage apparatuses, to which the plurality of information terminals are registered, from among the plurality of information storage apparatuses as the transmission destination of the information which is received by the receiving unit of the information processing apparatus.

6. The information processing system according to claim 1, further comprising:
a relay apparatus that is connected to a same network to which the information processing apparatus is connected, and configured to receive a request from the information processing apparatus to be transmitted to the information storage apparatus first and transmit the request, which is to be transmitted to the information storage apparatus, to the information storage apparatus.

7. The information processing system according to claim 1,
wherein the information processing apparatus is connected to a global network and the information storage apparatus is connected to a local network.

8. The information processing system according to claim 1,
wherein after a group in which the plurality of information terminals participate is created, the information is transmitted between the plurality of information terminals via the information processing apparatus while the group is active,
wherein the one or more of the plurality of information terminals is configured to prompt the user to select whether the information, which is transmitted via the information processing apparatus while the group is active, is to be stored on the storage unit,
wherein the plurality of information terminals and the information processing apparatus are connected to the first network that is the Internet and the information storage apparatus is connected to the Internet via the firewall such that the information storage apparatus does not permit an access from an unregistered information terminal, wherein when the user selects that the information is to be stored on the storage unit, the information processing apparatus transmits the information to the information storage apparatus to store the information on the information storage apparatus, and wherein after transmitting the information to the information storage apparatus, the information processing apparatus deletes the information such that the information is not stored in the information processing apparatus but stored in the information storage apparatus.

9. The information processing system according to claim 8, wherein one or more of the plurality of information terminals is configured to acquire, from the storage unit via the information processing apparatus, the information, which has been transmitted so far in the group.

10. The information processing system according to claim 1, wherein the first information terminal is configured to select whether the chat messages to be transmitted are to be stored on the storage unit, wherein when the third information terminal participates in the group after the first information terminal selects that the chat messages are to be stored on the storage unit, the chat messages are displayed on the screen of the third information terminal, and wherein when the third information terminal participates in the group after the first information terminal selects that the chat messages are not to be stored on the storage unit, the chat messages are not displayed on the screen of the third information terminal.

11. An information processing system comprising:
a plurality of information terminals;
an information processing apparatus; and
an information storage apparatus, wherein the information processing apparatus is connected to a first network and the information storage apparatus is connected to a second network, said first and second networks being connected each other via a firewall, wherein each of the plurality of information terminals includes
a transmission unit configured to transmit information to the information processing apparatus, and
a receiving unit configured to receive information which is transmitted from the information processing apparatus and which is transmitted from one of the plurality of information terminals to the information processing apparatus, wherein the information storage apparatus includes
a storage unit configured to store the information which is transmitted from the information processing apparatus, wherein a first information terminal and a second information terminal of the plurality of information terminals are configured to participate in a group in which chat messages are transmitted, wherein, after the chat messages are transmitted in the group in which the first information terminal and the second information terminal participate, a third information terminal of the plurality of information terminals is configured to participate in the group, and wherein the first information terminal is configured to select whether the chat messages transmitted before the third information terminal participates in the group are to be displayed on a screen of the third information terminal.

* * * * *